(12) United States Patent
Bahl et al.

(10) Patent No.: US 7,610,057 B2
(45) Date of Patent: Oct. 27, 2009

(54) SELECTING A WIRELESS NETWORKING TECHNOLOGY ON A DEVICE CAPABLE OF CARRYING OUT WIRELESS NETWORK COMMUNICATIONS VIA MULTIPLE WIRELESS TECHNOLOGIES

(75) Inventors: Pradeep Bahl, Redmond, WA (US); Paramvir Bahl, Sammamish, WA (US); Amer Hassan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 403 days.

(21) Appl. No.: 10/830,516

(22) Filed: Apr. 23, 2004

(65) Prior Publication Data

US 2005/0239497 A1  Oct. 27, 2005

(51) Int. Cl.
 *H04B 7/00* (2006.01)
 *H04W 4/00* (2009.01)
 *H04M 1/00* (2006.01)

(52) U.S. Cl. .................... 455/522; 455/525; 455/552.1; 455/432.3; 455/433; 455/434

(58) Field of Classification Search ................ 455/525, 455/435.3, 432.3–434, 552.1
See application file for complete search history.

(56) References Cited

U.S. PATENT DOCUMENTS

| | | | |
|---|---|---|---|
| 4,088,840 A | 5/1978 | Castet | |
| 5,517,677 A | 5/1996 | Moon | |
| 5,809,419 A | 9/1998 | Schellinger et al. | |
| 6,052,590 A | 4/2000 | Hicks et al. | |
| 6,385,460 B1 | 5/2002 | Wan | |
| 6,393,006 B1 | 5/2002 | Kajihara | |
| 6,393,282 B1 | 5/2002 | Iimori | |
| 6,801,777 B2 * | 10/2004 | Rusch | 455/452.2 |
| 6,807,163 B1 | 10/2004 | Shi | |
| 7,065,367 B2 | 6/2006 | Michaelis | |
| 7,110,783 B2 | 9/2006 | Bahl et al. | |
| 7,120,129 B2 | 10/2006 | Ayyagari et al. | |
| 7,180,876 B1 | 2/2007 | Henry | |
| 7,230,933 B2 | 6/2007 | Bahl et al. | |

(Continued)

FOREIGN PATENT DOCUMENTS

EP  1119137  7/2001

(Continued)

OTHER PUBLICATIONS

U.S. Appl. No. 10/693,655, filed Oct. 24, 2003, Krantz et al.

(Continued)

*Primary Examiner*—Yuwen Pan
*Assistant Examiner*—Bobbak Safaipour
(74) *Attorney, Agent, or Firm*—Wolf, Greenfield & Sacks, P.C.

(57) ABSTRACT

Criteria-driven methods and a framework are disclosed that facilitate configuration/selection of one or more wireless network interfaces/networks for carrying out wireless communications on a computing device. The wireless network interface selection and coexistence driver architecture described herein facilitates automated selection of a particular mode of network access based upon status information provided by a set of network interface drivers associated with particular network interfaces and wireless technologies. Furthermore, a criteria-driven interface/network selection framework is described that is potentially invoked in a variety of situations including, but not limited to, when an application is invoked or to select another interface/network to avoid detected interference.

49 Claims, 9 Drawing Sheets

U.S. PATENT DOCUMENTS

| | | |
|---|---|---|
| 2001/0023446 A1* | 9/2001 | Balogh ................. 709/229 |
| 2002/0039892 A1* | 4/2002 | Lindell ................. 455/151.1 |
| 2002/0065941 A1 | 5/2002 | Kaan |
| 2002/0082044 A1 | 6/2002 | Davenport |
| 2002/0198980 A1 | 12/2002 | Najafi |
| 2003/0058884 A1 | 3/2003 | Kaliner |
| 2003/0065816 A1 | 4/2003 | Dharmahikari |
| 2003/0100308 A1* | 5/2003 | Rusch ................. 455/445 |
| 2003/0210658 A1 | 11/2003 | Hernandez et al. |
| 2004/0023634 A1 | 2/2004 | Jeong et al. |
| 2004/0077341 A1 | 4/2004 | Chandranmenon |
| 2004/0116140 A1 | 6/2004 | Babbar |
| 2004/0131078 A1 | 7/2004 | Gupta |
| 2005/0009525 A1 | 1/2005 | Evslin |
| 2005/0037755 A1* | 2/2005 | Hind et al. ............. 455/435.3 |
| 2005/0091357 A1* | 4/2005 | Krantz et al. ........... 709/223 |
| 2005/0170832 A1* | 8/2005 | Cooper ................. 455/434 |
| 2005/0176420 A1 | 8/2005 | Graves |
| 2005/0193150 A1* | 9/2005 | Buckley et al. ......... 709/250 |
| 2006/0084417 A1 | 4/2006 | Melpignano |
| 2007/0076665 A1 | 4/2007 | Nair |
| 2007/0223408 A1 | 9/2007 | Thielke et al. |

FOREIGN PATENT DOCUMENTS

| | | |
|---|---|---|
| EP | 1119137 A1 * | 7/2001 |
| EP | 1489788 | 12/2004 |
| EP | 1526682 | 4/2005 |
| WO | WO 01/35578 | 5/2001 |
| WO | WO 01/35585 A1 | 5/2001 |
| WO | WO 0135578 A1 * | 5/2001 |
| WO | WO 01/63946 A1 | 8/2001 |
| WO | WO 02/41580 A1 | 5/2002 |
| WO | WO 03/047177 A1 | 6/2003 |
| WO | WO 2004/031488 | 4/2004 |
| WO | WO 2004031488 A1 * | 4/2004 |

OTHER PUBLICATIONS

U.S. Appl. No. 10/724,843, filed Dec. 1, 2003, Bhanu et al.
U.S. Appl. No. 09/805,500, filed Nov. 28, 2002, Ayyagari et al.
U.S. Appl. No. 10/723,673, Nov. 26, 2003, Wolman.

* cited by examiner

SELECTING A WIRELESS NETWORKING TECHNOLOGY ON A DEVICE CAPABLE OF CARRYING OUT WIRELESS NETWORK COMMUNICATIONS VIA MULTIPLE WIRELESS TECHNOLOGIES

FIELD OF THE INVENTION

This invention generally relates to the area of computer systems. More particularly, the present invention concerns methods and systems for selecting, configuring, and/or controlling wireless network communications on computing devices. Even more particularly the present invention is directed to decision-making within computing devices for addressing and/or avoiding wireless signal transmission interference.

BACKGROUND OF THE INVENTION

Today, a variety of wireless networking technologies support network connectivity. Wireless wide area network (WWAN) technologies, such as those embodying the GPRS, WCDMA, 802.16, etc. protocols, enable computing devices to connect to remote computer networks via cellular data transmission networks. Wireless local area network (WLAN) technologies, such as those incorporating the IEEE 802.11 a/b/g, HomeRF, Hiperlan/2, etc. protocols enable users to access local area network resources via wireless access points/transceivers. Wireless personal area network (WPAN) technologies, such as Ultra Wideband (UWB), and Bluetooth (BT), represent yet another wireless technology incorporated within computers today. There are other technologies that fall in the realm of command and control and inventory control such as Zigbee and RFID respectively. Physical and media access layer components associated with these technologies, in many instances, operate within overlapping frequency ranges in an uncoordinated manner—which results in signal interference.

Depending upon configuration and proximity to wireless network transceivers, a computing device receives/transmits radio frequency waves associated with one or more of the above-identified wireless technologies. In fact, depending upon the location, a computing device is able to maintain simultaneous wireless network connections via distinct network interface cards (NICs) installed on the computing device. Simultaneous availability/existence of wireless communication technologies and their associated wireless signal transmissions arise, for example, within an office environment that supports wireless local area network, wireless wide area network, and personal area network connectivity. The presence of multiple simultaneous networking technology options enhances flexibility with regard to how a computing device connects to networks and/or resources (including computer peripherals such as speakers, a keyboard, a mouse, etc.).

However, the abundance and wide variety of RF sources also increases the likelihood that a computing device having wireless communication capabilities will encounter and/or create signal interference, which leads to lowered quality of service and an unpleasant user experience. There are many types of interference—each having differing characteristics. For example, two wireless transceivers that utilize overlapping frequency spectrums create signal interference resulting in lost packets, dropped connections and uneven throughput (in the case of streaming connections). In some instances, a first transceiver operates at a sufficiently high signal power such that its operation is not affected by other competing signals; however, the operation of a second, lower power wireless transceiver is saturated by the higher power interfering signal from the first transceiver.

Interference can arise from differing sources. A first type of interference arises from the computing device itself that is simultaneously operating more than one wireless transmitter/receiver. For example, a computing device supports multiple wireless interfaces, incorporating different wireless technologies, that use overlapping wireless signal frequency bands. As a result, the wireless interfaces create conflict when used simultaneously. An example of such overlapping wireless technologies involves using IEEE 802.11b or 802.11g simultaneously with Bluetooth PAN appliances—since 802.11b/g transceivers utilize wireless frequencies that overlap frequencies potentially utilized by a Bluetooth wireless connection.

In an exemplary scenario where the existence of simultaneously active wireless interfaces/transceivers on a single computing device leads to signal interference, a DVD player streams a movie over an 802.11b WLAN connection to a personal computer. The personal computer user is simultaneously using a wireless (Bluetooth) mouse to check on movies facts in a separate window that is downloading pages from the Internet (accessed through a Bluetooth phone connected over GPRS). The Bluetooth signal between the mouse and the personal computer and between the personal computer and the Bluetooth phone conflicts with audiovisual data streaming signal from the DVD to the personal computer. The signal interference results in jerky presentation of the movie. The mouse movements are also likely to be jerky.

In another exemplary interference scenario, a camcorder sends an audiovisual stream to a personal computer over ultra wideband (UWB). At the same time, a user is connected to a wireless transceiver (access point) for a network over an 802.11a wireless connection that connects the user to the Internet via a cable modem/DSL line. In this potential interference scenario, the 802.11a signal interferes with the UWB data transmissions. As a consequence, the streamed recorded session appears jerky.

A second type of interference source arises from signal transmissions to/from other computing devices or interference sources that exist/operate independently of a computing device experiencing signal interference with regard to one or more wireless transmitters/receivers—external interference sources over which the computing device has no control. In addition to other computers, access points, etc. such interference can also arise from a variety of external interference sources such as cordless telephones, microwave ovens, etc.

A number of signal collision avoidance schemes operate within a single wireless protocol/technology. For example, in the area of wireless WAN, transceivers/drivers utilize CDMA, TDMA, and FDMA protocols that avoid transmission collisions with other transmitters utilizing the same technology. Such collision avoidance schemes are not well suited for heterogeneous wireless transmissions over shared frequency ranges because the different wireless transmissions can be using different collision avoidance protocols. This is especially true in the case of WPAN/WLAN wireless transceivers such as Bluetooth/UWB and 802.11 competing simultaneously for transmission time within unlicensed/unregulated overlapping frequency ranges.

One way for computing devices to respond to encountering signal interference is to allow the affected connection to degrade/fail. The computing device becomes aware of a particular connection failing. If the connection fails, the user is prompted to try re-connecting, or the user potentially selects an alternative network communication media (e.g., a wired connection to a network), or the computing device does this automatically if so prescribed by policy.

Known MAC drivers have implemented conflict avoidance schemes handling two wireless technologies. Vendors have implemented collaborative and/or signal cancellation schemes to avoid interference. For instance, in a single system including both an 802.11b and a Bluetooth transceiver, the system coordinates transmissions at the MAC level through a mode switch. The mode switch operation is based upon lower-layer procedures such as beacon reception (for 802.11b), paging (for Bluetooth), or by interleaving packets. The vendor's NIC can potentially support both Bluetooth (BT) and 802.11 in which case the NIC can determine when either of the two competing/interfering technologies is being used and stops the other transmission until the first is done. If there are two NICs, one for Bluetooth and one for 802.11, the two NICs could potentially be hardwired to each other so that one can determine when the other is transmitting and stop its own transmissions. This is a two-wire or four-wire approach depending upon the number of wires between the two NICs. Alternatively, a notification about a transmission can potentially be provided by one driver to another, for instance the Bluetooth driver or the 802.11 driver potentially provides a callable interface that would be used by the other driver to provide notification of a transmission. The mode switch arbitrates between 802.11b Bluetooth traffic. Then the switch allows transmission in favor of the traffic with higher priority. It is common to let traffic from HID devices (keyboard and mouse) to have the highest priority. Otherwise, 802.11b will have the priority traffic.

Furthermore, known wireless network interface selection criteria base automated selection of a Wi-Fi technology upon SSID (identity of a wireless network—facilitating determination of connectivity to particular resources such as the Internet) and maximum supported network connection speed. Under this relatively simple arrangement, if two differing wireless technologies offer connectivity to a same network/resource, then the faster wireless technology is selected.

SUMMARY OF THE INVENTION

The present invention comprises a method and framework for selecting wireless technologies/interfaces/networks. In particular the present invention comprises a method for selecting a wireless technology from among multiple available wireless technologies on a computing device for establishing a network connection. The method includes the steps of maintaining a wireless technology selection framework comprising a set of factors. One or more of the factors within the set of factors are incorporated into specified wireless technology selection criteria. A computing device incorporating the present invention acquires information regarding the status and/or capabilities associated with each available wireless technology supported by network interfaces on the computing device. Thereafter, the computing device renders factor values for ones of the set of factors based upon the set of information acquired for each available wireless technology. After calculating factor values, the computing device renders a wireless technology selection based at least in part upon applying the calculated factor values to the wireless technology selection criteria. The present invention thus facilitates implementing dynamic network interface/network selection on a computing device in response to a variety of sensed conditions that affect the values assigned to factors incorporated into specified wireless selection criteria.

The present invention is also embodied in a computer-readable medium containing computer-executable instructions that, when executed by a computing device, carry out the functionality described herein above.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

Figure 1:
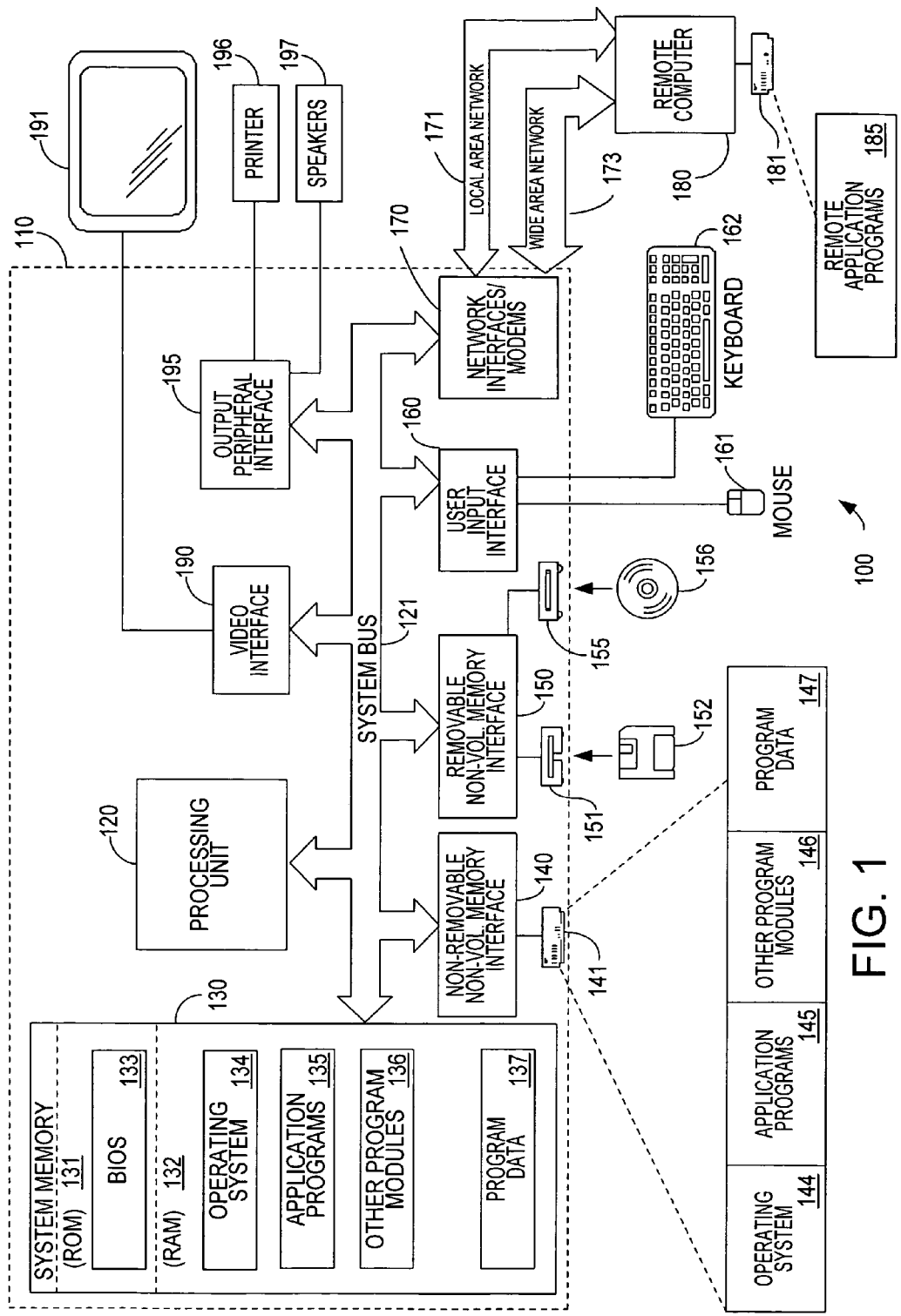
FIG. 1 is a simplified schematic illustrating an exemplary architecture of a computing device for carrying out an embodiment of the present invention.

An illustrative wireless network interface configuration/control architecture disclosed herein facilitates highly flexible/adaptable wireless network interface control spanning multiple wireless technologies. The wireless network interface configuration/control platform, in the illustrative embodiment, includes a coexistence driver that executes at a network communications layer over individual media access drivers that generally control the flow of data sets (e.g., packets) for a particular media type (e.g., 802.11 WLAN). The coexistence driver, instantiates one or more virtual coexistence drivers (VCDs), each of which handles a particular combination of potentially interfering wireless media technologies and even multiple network interfaces incorporating a same wireless media technology. A VCD accumulates status information and performance metrics from network interface devices (e.g., network interface cards) associated with each wireless technology in the combination being handled by it.

Initially, the coexistence driver determines the set of virtual coexistence drivers currently needed for a computing device that utilizes one or more wireless networking technologies. The coexistence driver determines the set of interference sources/technologies currently affecting the operation of presently installed wireless network interfaces. The coexistence driver consults a conflict map specifying the potentially conflicting wireless technologies for each supported wireless technology. If a conflicting wireless technology within the conflict map is currently installed on the computing device, then it is added to a conflict set. Furthermore, if a machine only has an 802.11b card, but a Bluetooth phone is in the vicinity of the machine and is currently talking to another machine or an AP, then the Bluetooth interference source is factored into the selection and configuration of a particular VCD for the purpose of carrying out conflict avoidance. The machine containing the 802.11b card is limited in its conflict avoidance strategy since it only has control over 802.11b device and not over the BT device. However, at least part of an 802.11b/BT VCD's conflict avoidance logic (e.g., changing the 802.11 frequency band) can potentially be used. Upon completion of this initial conflict detection step, the coexistence driver selects and launches a VCD corresponding to each identified set of conflicting technologies/interference sources.

Each virtual coexistence driver established by the coexistence driver utilizes status information and performance metrics accumulated from the individual media access control (MAC) drivers of the conflicting wireless technologies to perform a set of tasks associated with controlling the flow of data sets (e.g., packets) to media access control drivers for communication over the wireless network interfaces installed on a computing device. Such tasks include: prioritizing transmitting data sets associated with conflicting (and therefore alternatively activated) wireless network interfaces; maintaining prioritized queues associated with pending requests, and passing queued data sets down to the media access control drivers according to a prioritization scheme; performing decision-making, based upon information supplied by multiple media access drivers, for adapting the operation of the wireless network interfaces; and issuing command/control instructions to the media access control drivers to control the wireless network interface cards in a manner that facilitates non-interfering operation of wireless interfaces and any other sources of wireless communication signal interference—whether arising from other installed wireless network interface cards or external sources of interference. In the illustrative embodiment, control packets (as an example, RTS (request to send)/CTS (clear to send) packets sent by an 802.11 driver) are not handled by the coexistence driver to avoid delaying time-critical information from reaching the wireless network interfaces.

Thus, in summary, the coexistence driver is a higher-level network device driver that executes a coexistence protocol on top of a set of media-specific access control drivers to handle conflicts/interference between same or distinct wireless technologies. The coexistence driver handles conflicts/interference in potentially many ways, including disabling/avoiding using particular frequency ranges (channels) in a particular wireless transceiver to eliminate signal frequency overlap or signal bleed where even if the frequencies are non-overlapping, because of their close proximity, the transmission over one can affect the transmission/reception over the other. In the event that signal frequency overlap cannot be prevented, then the coexistence driver controls (multiplexes) data set transmissions by the competing wireless technologies to avoid simultaneous use of the overlapping frequencies by multiple wireless technologies represented within a virtual coexistence driver. The position of the coexistence driver above media-specific wireless media access control drivers enables the coexistence driver to implement a variety of conflict/interference reduction schemes, based upon accumulated wireless network metrics, including handling the different data sets (e.g., packets) to be transmitted over different interfaces appropriately, that would otherwise not be available or difficult to obtain by the individual media access control drivers because of their lack of a global view across different media access control drivers or even an absence of coordination between two network interfaces because they are from different vendors or using the same wireless technology such as two 802.11b transceivers on the same computing device.

Furthermore, a method and infrastructure for implementing wireless technology selection criteria on a computing device capable of supporting wireless communications via multiple wireless technologies is disclosed herein. The selection framework is based upon knowing the capabilities/status of a present wireless networking environment, knowing the current wireless networking demands/needs of a computing device, and making intelligent/robust decisions based upon the capabilities/status of the various networks/interfaces and current demands/needs of the computing device. In exemplary embodiments these basic concepts are implemented by dynamically acquired network information and statically as well as dynamically defined criteria that are designated and modified (e.g., weighting of factors) based upon currently sensed status information and application/user requirements.

FIG. 1 illustratively depicts an example of a suitable operating environment 100 for a computing device (e.g., a notebook computer, an appliance such as access point, etc.) used in an environment supported by multiple networks accessed via various differing wireless communication technologies. The operating environment 100 is only one example of a suitable operating environment, and is not intended to suggest any limitation as to the scope of use or functionality of the invention. Other well known computing systems, environments, and/or configurations that may be suitable for use with the invention include, but are not limited to, personal computers, server computers, laptop/portable computing devices, multiprocessor systems, microprocessor-based systems, network PCs, minicomputers, mainframe computers, server appliances, access points, base stations, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is potentially incorporated within network nodes operating in distributed computing environments where tasks are performed by remote processing devices that are linked through a communications network. In a distributed computing environment, program modules are generally located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media such as wireless PAN, wireless LAN and wireless WAN media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through one or more wired/wireless network interfaces 170. Furthermore, the set of one or more wired/wireless network interfaces 170 support communications over the WAN 173, such as the Internet. While not shown in FIG. 1, computer 110 potentially includes an internal or external modem, connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The present invention is potentially incorporated into both mobile and non-mobile computing devices/machines used in a variety of dynamic networking environments and executing a variety of tasks. In such environments, the availability of certain channels/frequencies potentially changes as the set of active wireless media changes. This in turn can have an adverse effect upon the quality of service on particular wireless media. The present invention facilitates configuring and/or regulating traffic to wireless network interfaces to reduce interference between wireless network interfaces that use overlapping frequency ranges. An embodiment of the present invention also accommodates interference arising from external sources (e.g., a cordless phone system, a microwave oven, a Bluetooth device transmitting to another computing device, etc.) over which a computing device has no control. Furthermore, selection criteria are used to select/suggest a particular one of multiple available wireless network technologies supported by a computing device.

Figure 2:
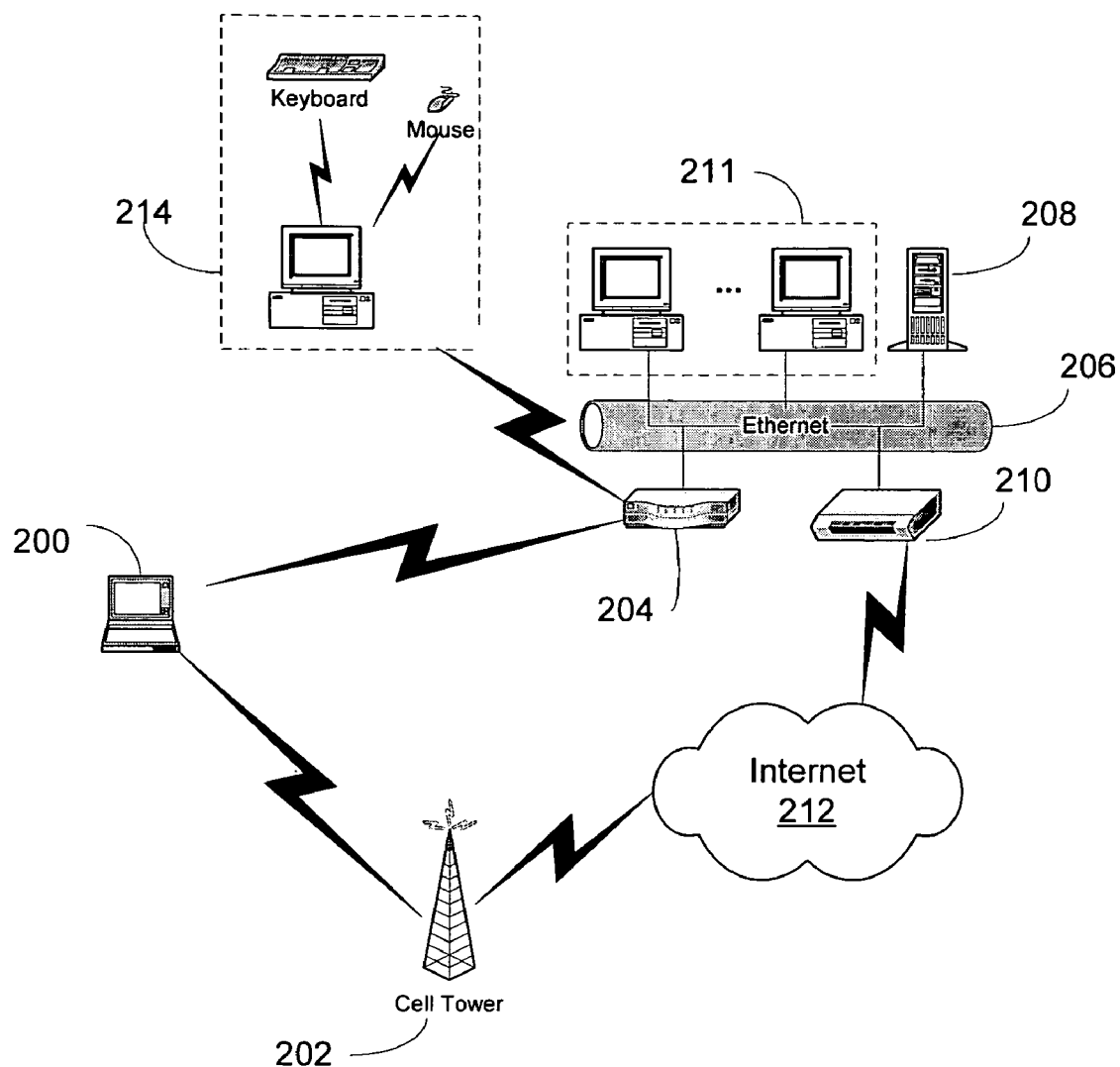
FIG. 2 is an exemplary multiple network communication media arrangement including multiple competing/interfering wireless technologies.

Turning to FIG. 2, a simple example of a wireless computing environment is depicted wherein the invention is potentially exploited. In the illustrative environment, a notebook computer 200 includes multiple network interface cards (not specifically shown) facilitating communications over multiple network media. In the particular example depicted in FIG. 2, the notebook computer 200 potentially communicates with a cellular transmission tower 202 using WWAN wireless technology such as GPRS and a wireless transceiver 204 using WLAN wireless technology such as 802.11b.

The wireless transceiver 204 (also referred to as a wireless access point, or WAP), provides access to a variety of resources on the LAN 206. For example, the wireless transceiver 204 provides access by the notebook computer 200 to directories maintained on a file server 208. The LAN 206 also contains a gateway/firewall/modem 210 providing access, by users of computing devices connected to the LAN 206 (including a set of computers 211 and the user of the notebook computer 200), to the Internet 212. The gateway/firewall/modem 210 also provides access by users of the Internet 212 to resources on the LAN 206.

The user of the notebook computer 200, as a result of the multiple supported network media, is able to access the Internet 212 and the LAN 206. It can access the file server 208 via multiple communication media (through the Internet 212 and the LAN 206). For example, utilizing a WWAN network interface, the notebook computer 200 is able to access the Internet 212 via a cellular network including the cellular transmission tower 202. It can access the resources on the LAN 206 through the gateway/firewall 210. Alternatively, the notebook computer 200 accesses resources on the LAN 206 via the wireless transceiver 204. Similarly, the LAN 206 in the illustrative example is assumed to include network access and proxy servers that enable a properly authenticated user of the notebook computer 200 to access resources of the Internet 212 and the LAN 206 via either of the two illustratively depicted wireless network media. Such dual capabilities for accessing resources introduces the potential for selection of a particular one of the wireless network media based upon current conditions, needs, preferences, latencies, cost, etc. of the user of the notebook computer 200.

In the illustrative network embodiment depicted in FIG. 2, a personal computer 214 located proximate to the notebook computer 200 is equipped with multiple wireless network technology interfaces. The personal computer 214 communicates with the LAN 206 via the wireless transceiver 204 (operating under the 802.11b WLAN protocol). Furthermore, and of particular relevance to an embodiment of the present invention, the PC 214 includes a Bluetooth wireless transceiver/interface supporting a variety of wireless appliances including, for example, a mouse, a keyboard and a phone. Because the specified frequency spectra of the Bluetooth and 802.11b wireless network communication protocols overlap, the simultaneous operation of Bluetooth appliances and an 802.11b connection potentially affects/degrades the quality of service on the 802.11b connection between the personal computer 214 and the wireless transceiver 204. Likewise, the 802.11b connection potentially affects/degrades the quality of service on the Bluetooth connections. Furthermore, if the notebook computer 200 is sufficiently close to other Bluetooth appliances that may/may not be communicating with the notebook computer, then the 802.11b WLAN connection between the notebook computer 200 and the wireless transceiver 204 is also potentially adversely affected by interference associated with the Bluetooth signal transmissions and vice versa. This scenario as well as others such as the ones described herein above are handled by a coexistence driver that processes information associated with potentially multiple wireless technologies to establish/carry out a coexistence scheme that seeks to address signal interference arising from overlapping frequency spectra associated with same or distinct wireless network technologies—such as Bluetooth and 802.11b wireless communications. A special case is one of interference between transceivers utilizing a same wireless network technology such as two 802.11b, g, or a radios using overlapping frequencies or frequencies that are close to each other—and therefore create signal interference.

Figure 3:
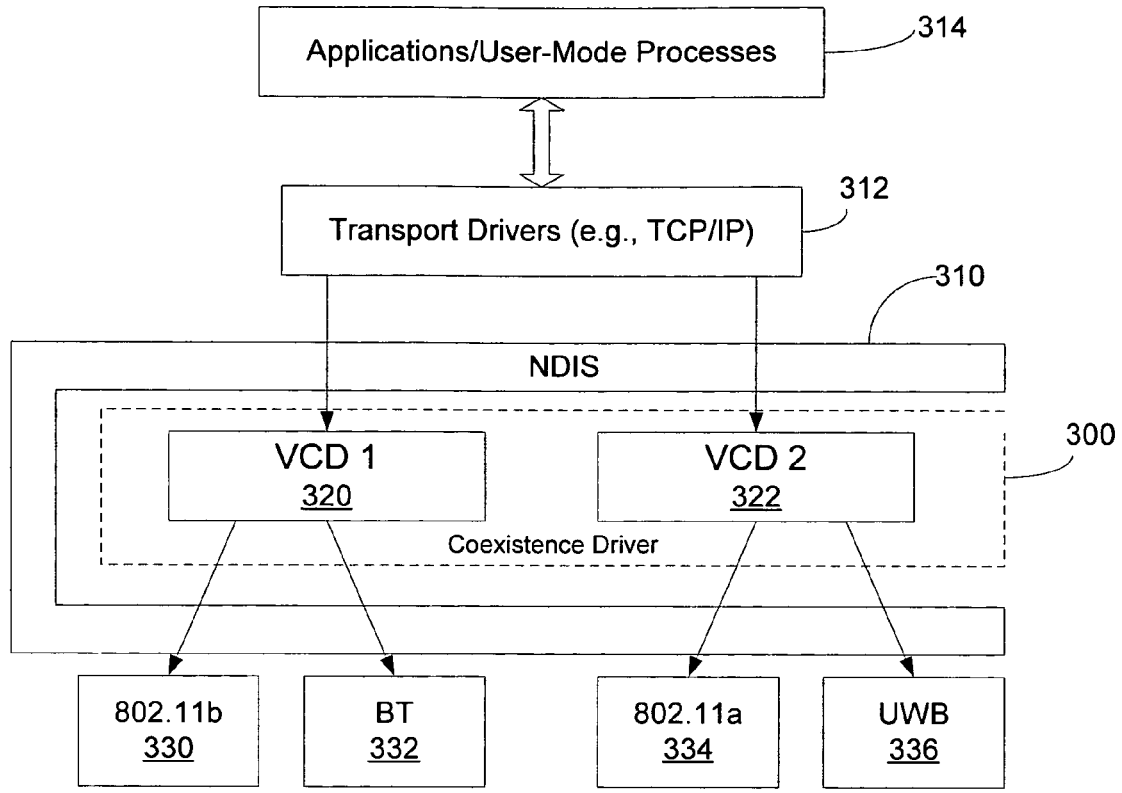
FIG. 3 is a schematic diagram identifying components in system including a coexistence driver embodying the present invention.

Turning to FIG. 3, a coexistence driver 300 incorporated within computing devices such as the notebook computer 200 and personal computer 214, applies adaptation and packet flow control schemes to operational/status information pertaining to potentially multiple supported network media technologies across potentially multiple network interfaces. Thereafter, the coexistence driver 300 configures wireless network interfaces and, if necessary, sequences/controls data packet flow to wireless network interfaces experiencing interference from either internal or external sources. In the illustrative embodiment of the invention, the coexistence driver 300 operates within a network driver interface specification (NDIS) layer 310 of the MICRSOFT WINDOWS operating system. Thus, rather than requiring a separate set of interfaces, the exemplary coexistence driver 300 operates as an intermediate sub-layer within the NDIS layer 310 through which outgoing data from transport drivers 312 passes before being submitted to protocol-specific wireless interface drivers.

With continued reference to FIG. 3, in an embodiment of the invention the coexistence driver 300 creates/installs and hosts a set of virtual coexistence drivers (VCDs) such as VCD 320 and VCD 322 for handling particular combinations of actual or external interfering wireless technologies. Each of the VCDs handles packets destined for one of a set of wireless network interfaces supported by the VCD. For example, the VCD 320 handles packets destined for an 802.11b network interface driver 330 and a Bluetooth network interface driver 332. The VCD 322 handles packets destined for an 802.11a network interface driver 334 and an Ultra Wideband network interface driver 336. By placing the VCDs above the individual network interface drivers, the VCDs are able to perform a variety of configuration/control operations based upon aggregated information associated with each of a set of interfaces utilizing potentially interfering network technologies (e.g., Bluetooth and 802.11b).

In an embodiment of the invention, all VCDs are derived from a base class managed by the coexistence driver 300. The coexistence driver 300 creates a particular instance of a VCD, including a customized context and functions, based upon identified sources of interference. Identification of conflicting technologies and sources of interference and selection of appropriate VCDs instances are discussed further herein below. Once installed, the degree of control and the nature of control of each VCD over packets passed down to network interface drivers via the NDIS layer 310 is determined by programming of the VCDs and, potentially, configuration selections exposed to users by the coexistence driver 300 and/or the VCDs hosted by the coexistence driver 300.

Figure 4:
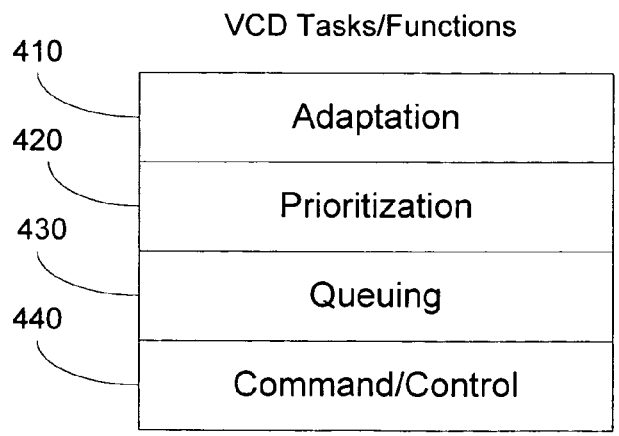
FIG. 4 summarizes an exemplary set of tasks embodied within virtual coexistence drivers that carry out coexistence schemes for handling sources of wireless interface signal interference.

Having generally described an exemplary wireless network driver arrangement for carrying out the present invention, attention is directed to FIG. 4 that identifies a set of tasks/functions executed by exemplary VCDs and customized according to a set of interference sources for which the VCDs manage coexistence. It is noted that the identified tasks are not necessarily limited to particular program segments/modules. Rather, the tasks are identified as a way to conceptualize and compartmentalize exemplary functionality exhibited by VCDs created by the coexistence driver 300 to adaptively handle interference problems that arise from conflicting wireless technologies as well as any other sources of interference.

Adaptation Task 410

An adaptation task 410, carried out by the VCDs within the virtual coexistence driver 300 involves designating, in response to a set of identified actual/potential interference conditions, a coexistence scheme for a set of installed wireless interfaces. A set of exemplary coexistence schemes are described herein below with reference to FIGS. 6 and 7. The adaptation task 410 further comprises rendering wireless network interface control instructions carrying out the designated scheme. The interface control instructions establish a particular mode of operation of the network interfaces and/or regulate the timing of data packet transmissions by the particular network interfaces under the control of associated drivers. For example, the VCD 320 designates a coexistence scheme and makes configuration and data traffic control decisions regarding a first network interface associated with the 802.11b driver 330 and a second network interface associated with the Bluetooth driver 332.

C/I Computations Application/Channel Selection

In an embodiment of the invention, the adaptation task, as embodied in the adaptation task 410 periodically processes information about each of the particular wireless technologies for the VCD to render a congestion/interference (C/I) metric for each supported channel for each particular supported wireless technology. The information gathered for each channel of a given wireless technology includes, for example: signal strength, packet error rate, packet loss rate, average retry count, noise level, and estimated congestion. Such information, or at least parts thereof, is provided by known media access control drivers. The C/I metric takes into account both interference generated by installed wireless transceivers and external sources of interference—such as another user operating a Bluetooth device for another computing device.

The C/I metric generated for each channel of each wireless technology is thereafter used in potentially many ways by the VCD to reduce/avoid interference between wireless technologies and other sources of signal interference. In a first form of interference avoidance, the adaptation task 410 utilizes the C/I metric generated for a particular wireless technology to select a best channel or set of channels upon which data traffic flows for the particular wireless technology. However, in instances where no acceptable channels are available and an alternative wireless technology is available for supporting the desired traffic flow, the VCD executes a wireless technology selection procedure. In this second form of interference avoidance the network selection procedure (discussed herein below) is executed by, for example, the coexistence driver 300 to determine a different network communication technology to handle the traffic flow.

Prioritization Task 420

The prioritization task 420 implemented by each VCD ensures that crucial information is passed in a timely manner and ensures that all data packets, regardless of initially assigned priority, are eventually transmitted according to the prioritization scheme specified by the adaptation task 410. Such prioritization schemes are desired in cases where sequenced, non-simultaneous packet transmissions are prescribed to handle potential conflicts between two or more co-located wireless technologies. In an exemplary traffic handling method described below, the prioritization task 420 is responsible for assigning/re-assigning priority to data packets passed down to the NDIS layer 310.

The priorities are potentially assigned to data traffic handled by the VCDs according to a variety of factors that generally reflect the individual needs of a user/application from which the data originates. The priorities are initially assigned, for example, by user-specified preferences regarding application priority. In other instances, priorities are based upon particular applications for which particular priorities are provided to ensure a particular data rate. Similarly, in yet other instances, initial priority is based upon an application type (e.g., a DVD viewer program), the type of data (e.g., phone conversation), or the destination of the data (a DVD player).

In an embodiment of the invention, all control packets, are allowed to bypass any coexistence scheme implemented by a VCD of the coexistence driver 300. MAC level control packets are not handled by the coexistence driver because they are in general time-critical (microsecond granularity). They are therefore considered high priority, and thus it is appropriate to transmit such packets first (as high priority/time critical packets) without delay and let the MAC drivers handle conflicts (and packet losses) that may arise from by-passing the VCD traffic control schemes. Because control transmissions make up a relatively small percentage of all transmissions, such pass-through accommodation for the control packets does not significantly affect the advantages provided by the VCDs with regard to conflict avoidance. On the other hand, it is much more important to provide conflict avoidance for data packets. This is because the time criticality of data packets is generally lower than that of control packets, the data packets form a much larger portion of the total traffic, and the volume of some data transmissions, if not prioritized, can cause many conflicts and a significant drop in throughput.

Queuing Task 430

The queuing task 430 operates in coordination with the prioritization task 420 and command/control task 440 to sequentially transmit data packets down to technology-specific drivers in an orderly manner to avoid signal transmission interference for conflicting wireless technologies. The queuing task 430 maintains a queue of pending data packets for each supported priority level (or sub-levels that facilitate prioritizing within each queue level by originally assigned priority). In an embodiment of the invention, each VCD that supports a sequencing coexistence scheme (described herein below with reference to FIG. 7) implements a software switch that takes a packet at the head of the queue, passes the packet to an appropriate wireless technology interface driver, receives a transmit complete notification, and then sends a next pending packet (referred to herein generally as a data set in recognition of potentially other ways of grouping data for transmission via a network interface).

In an embodiment of the present invention, the queuing task 430, upon completion of the sequential transmission of all or some packets (based on criteria of avoiding starvation of low priority packets in the presence of a steady stream of high priority packets) for a currently highest priority queue, boosts the priority of all remaining pending packets (associated with lower priority queues) by one level before resuming transmitting packets from a highest transmit queue having pending packets. Furthermore, within each priority level, sub-levels are maintained according to base priority levels assigned to packets when they were initially queued. Within the highest current queue level, sub-level queues are handled in the order of the base priority assigned each packet.

Command/Control Task 440

The command/control task 440 involves communicating control instructions to relevant network interface drivers. Such instructions are based, in a first instance, upon configuration decisions rendered by the adaptation task 410 such as channel selections and other high-level operation mode decisions. Thereafter, in a second instance, the command/control task 440 receives packet transmission requests designating one of the network interface drivers. In response, the command/control task 440 issues wireless technology protocol-specific commands/instructions to the designated drivers to initiate transmitting the received packets. The command/control task 440 subsequently receives and passes packet transmission completion notifications that are potentially used by the VCD to ensure only one packet is transmitted at a time. As noted above, in an embodiment of the invention, the conflict avoidance mechanisms are not applied to time-sensitive control packets since the control packets are passed to the appropriate network communication driver without imposing potential waits within the queues maintained by VCDs.

Method for Creating VCDs

Figure 5:
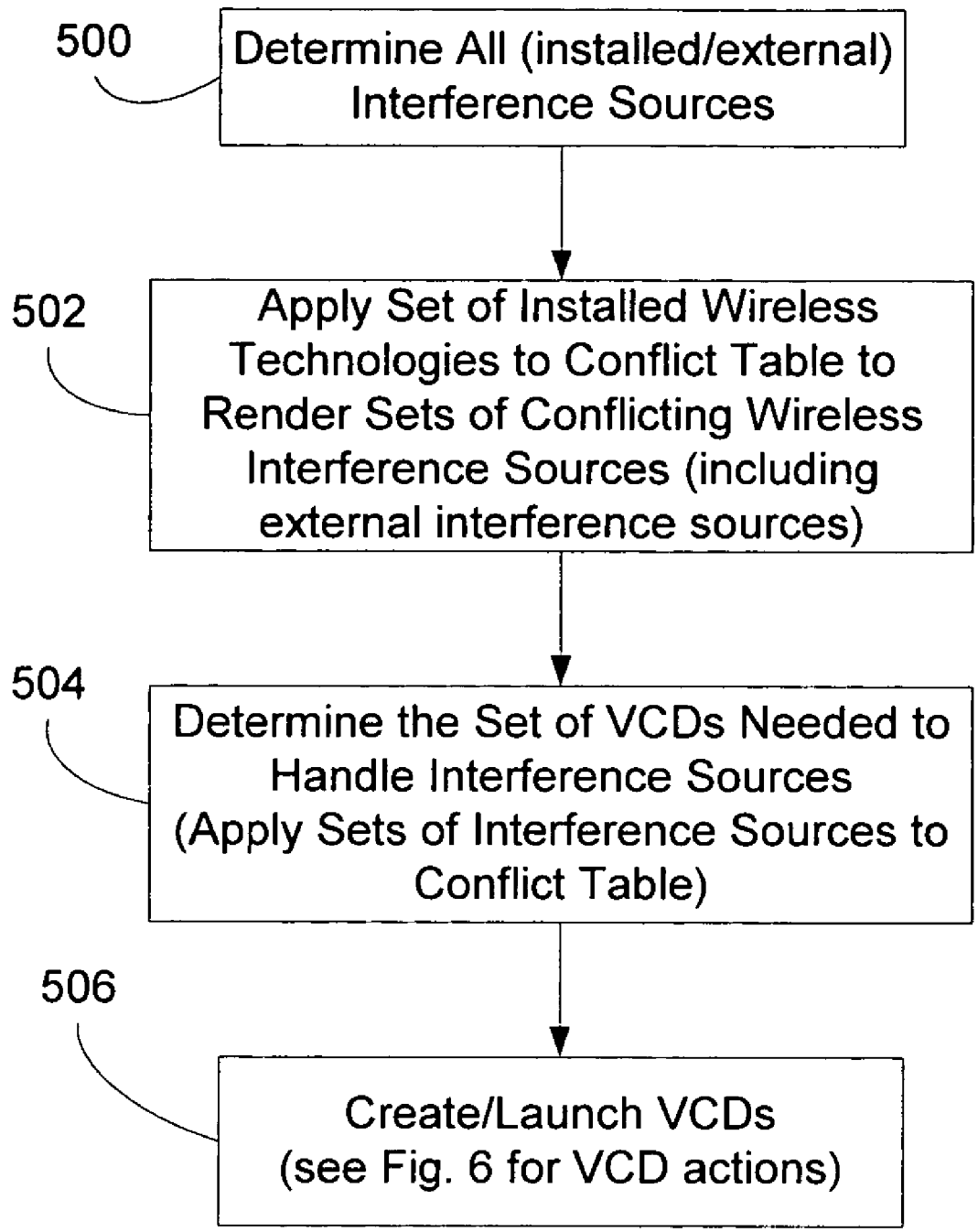
FIG. 5 summarizes a set of steps performed by a coexistence driver to designate and activate a set of virtual coexistence drivers.

Having described an exemplary coexistence architecture for implementation within a computing system, attention is directed to FIG. 5 that summarizes steps performed by the coexistence driver 300 to create VCDs to handle potential signal conflicts between wireless technologies and any other sources of wireless signal interference encountered by network interfaces on a computing device during transmission of sets of data (e.g., packets). In an embodiment of the present invention, the coexistence driver 300 launches VCDs on demand and according to a set interference sources presently known, detected, and/or identified by a computing device upon which the coexistence driver 300 resides. The computing device awaits notifications regarding changes to a set of interference sources (including multiple network interfaces utilizing a same wireless technology), and launches new VCDs, if needed, to handle changes to the set of co-located and external interference sources.

With reference to FIG. 5, in response to any one of a variety of notification types, including activation of a wireless network interface and sensing a new interference source, at step 500 the coexistence driver 300 assembles a set of potential sources of wireless interference for which coexistence handling is desired. In an embodiment of the invention the set of potential sources of interferences includes both co-located sources (e.g., installed wireless network interfaces) and external sources (e.g., a Bluetooth transceiver on a neighbor's computer system). The co-located sources are determined, for example, by querying a bindery that lists a set of installed and enabled devices (including wireless network interfaces), hitherto referred to as "active" devices/interfaces. The external sources are identified by sensing and analyzing (by the coexistence driver 300) signal characteristics and/or manually inputting a source type by a user having knowledge of a current operating environment.

Thereafter, during step 502, the coexistence driver 300 renders sets of conflicting wireless interference sources. In an embodiment of the invention, a master conflict map (e.g., a table or any other suitable data structure) is maintained that enumerates a set of "known" wireless technologies. For each wireless technology, a set of known sources of interference are identified within the master conflict table. An exemplary master conflict table is provided below that identifies conflicts with regard to 802.11a/b, Bluetooth, and UWB wireless technologies. The first row identifies a set of potential sources of interference with wireless interfaces. The first column identifies a set of wireless interface technologies. A more space-efficient arrangement entails a mapped set of bits within a stored set of bytes where each bit position represents a particular interference source type.

|         | 802.11b | 802.11a | UWB | BT |
|---------|---------|---------|-----|----|
| 802.11b |         |         |     | X  |
| 802.11a |         |         | X   |    |
| UWB     |         | X       |     |    |
| BT      | X       |         |     |    |

The coexistence driver 300 initially determines the set of interference sources for each wireless technology currently active on the computing device. In an embodiment of the invention, for each active wireless interface, the coexistence driver 300 traverses a set of interference sources that are known to potentially interfere with each active wireless interface. If an interference source identified during step 500 is present within the set of interference sources, then the interference source is added to a set of interference sources for purposes of designating an appropriate VCD. When all the active wireless interfaces have been processed, intersecting sets of interference sources are determined and the contents (identified interference sources) are merged. In the illustrative example set forth in FIG. 3, 802.11b and Bluetooth technologies belong to one interference source set, while 802.11a and UWB wireless technologies belong to a second set for which a VCD will be created.

During step 504, one or more VCDs are designated (if needed) by the coexistence driver 300 to handle interfering signal sources. In particular, the resulting merged sets of interference sources identified during step 502 are applied to a set of VCD descriptions to determine appropriate VCDs that are to be instantiated by the coexistence driver 300. In the example provided in FIG. 3, the coexistence driver 300 creates the VCD 320 to handle potential conflicts between an 802.11b network interface and a Bluetooth interface, and the coexistence driver 300 creates the VCD 322 to handle potential conflicts between an 802.11a network interface and a UWB interface.

It is noted that a particular wireless technology need not be present/installed on the computing device upon which the coexistence driver 300 operates to be considered an interference source for purposes of designating/creating VCDs. Thus, for example, VCD 320 is created to handle conflicts between 802.11b and Bluetooth technologies regardless of whether both types of wireless network interfaces are located on the computing device (or one of the wireless technologies is merely an external source of interference). However, the subsequent operation of the adaptation 410, the prioritization 420 and the queuing 430 tasks of the VCD is effected by whether the interference source is located on the computing device since an external interference source cannot submit data sets (packets) for transmission by the computing device. A VCD is capable of adapting to external interference sources. By way of example, if a VCD determines that an 802.11b transmitter is creating interference, then the VCD can adapt/restrict transmissions by a BT driver under its supervisory control to particular, non-impacted frequency ranges. Likewise, if the source of interference of an 802.11b transceiver is a BT transmitter, then the VCD can potentially select a particular available channel that is less likely to encounter interference with the BT transmitter.

During step 506 the coexistence driver 300 launches the set of VCDs designated during step 504. In an illustrative embodiment, the VCDs 320 and 322 are instantiated from sub-classes derived from a VCD base class. As such, VCDs 320 and 322 share an executable code base that is provided for all VCDs launched by the coexistence driver 300. However, each subclass includes its own unique set of functions, operations, methods, etc. for carrying out the above-described VCD tasks set forth in FIG. 4. Each VCD instance is provided its own context. Each of the VCDs operates within the coexistence driver 300 that, in turn, operates at as intermediate layer within the NDIS protocol stack.

Coexistence Handling by Each VCD

Figure 6:
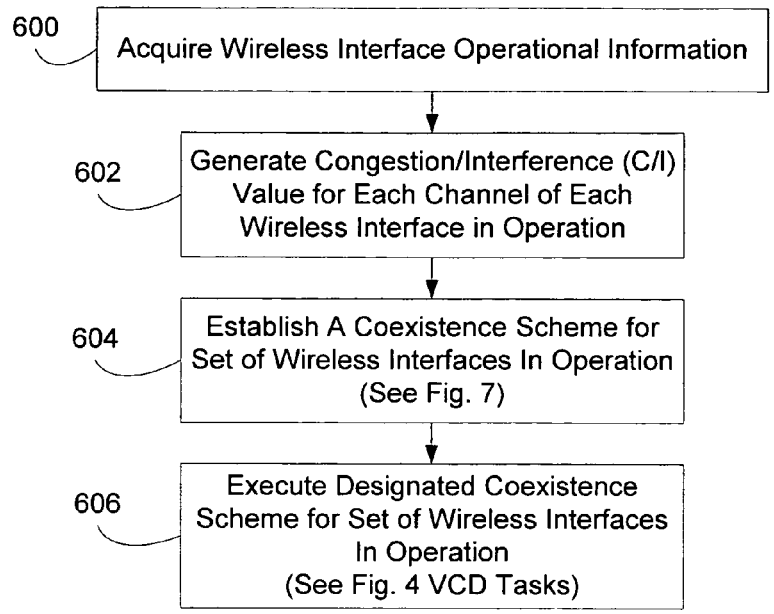
FIG. 6 summarizes a set of steps performed by virtual coexistence drivers performed upon launch.

Turning to FIG. 6, a set of steps summarize the operation of an exemplary VCD upon being launched by the coexistence driver 300 during step 506. In general, the VCD performs a set of steps to adapt the VCDs operation to existing/potential interference conditions. Thereafter, the VCD carries out a designated coexistence scheme addressing currently existing interference conditions. In an embodiment of the invention, the set of steps summarized in FIG. 6 is restarted and executed upon receiving notification of an appropriate triggering event—such as a lost connection, a disabled network interface, degradation/improvement of quality of service on a wireless interface, etc.

Once launched by the coexistence driver 300, at step 600 the VCD, or an entity acting on behalf of the VCD, obtains operational information from media access control drivers regarding the active network interfaces with which the VCD is associated. Such information includes: operational frequencies, signal strength, packet error rate, average retry count, packet loss rate, noise threshold, etc. The information gathering step 600 can be repeated any number of times for every iteration of the steps set forth in FIG. 6—even while other ones of the steps depicted in FIG. 6 are executing. Thus, the data acquired between iterations of the complete sequence depicted in FIG. 6 can be processed (e.g., averaged) to eliminate instantaneous aberrant readings that do not represent the long-term operating environment of the wireless network interfaces.

During step 602, the VCD determines a "congestion/interference (C/I) metric" for each channel of each wireless interface in accordance with the above-described adaptation task 410. The metric, in an embodiment of the present invention, comprises a weighted average of the information acquired during step 600. Thereafter, during step 604, also associated with the adaptation task 410, the C/I values are used to select an available channel (or channels) for one or more of the traffic flows to one or more wireless network interfaces served by the VCD. An exemplary set of steps for performing channel selections, and potentially selecting a different network interface, is described herein below with reference to FIG. 7.

After selecting a set of channels, at step 606 the VCD executes the aforementioned VCD adaptation 410, prioritization 420, queuing 430, and command/control 440 tasks specified, by way of example, in FIG. 4. The adaptation task 410 potentially includes periodically determining the C/I values for the channels and re-executing steps 600, 602 and 604 to establish a new set of channels (and possibly a differing set of network interfaces).

Figure 7:
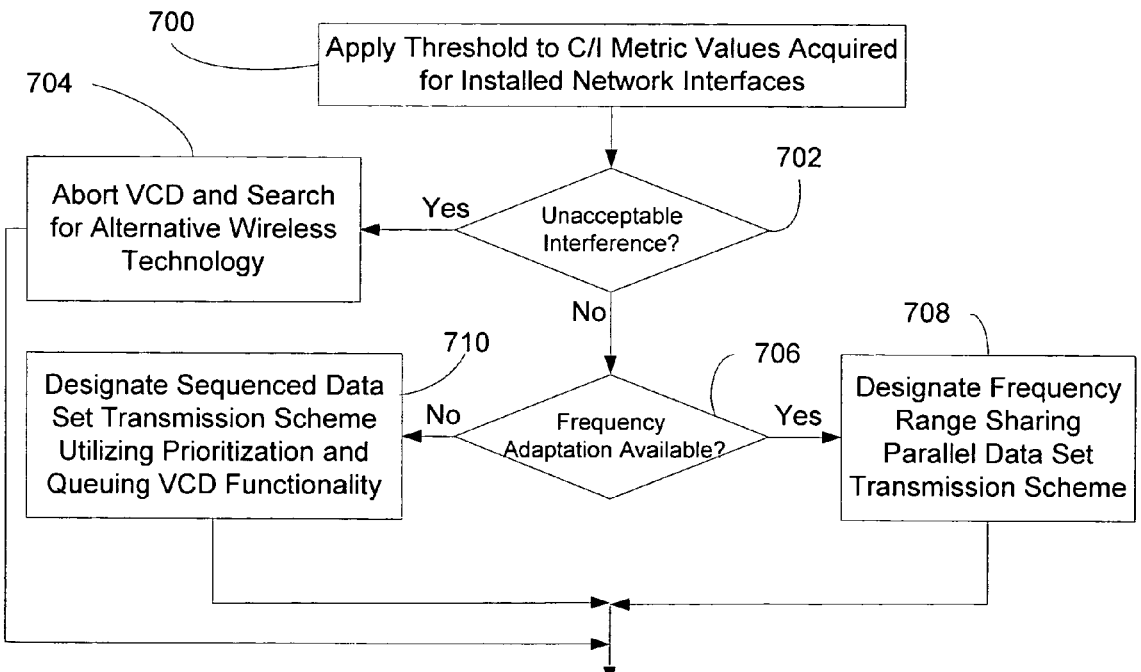
FIG. 7 summarizes a set of steps performed by virtual coexistence drivers to establish a coexistence scheme addressing potential wireless interference sources.

Turning to FIG. 7, a set of steps are summarized for performing channel selections and establishing an appropriate coexistence scheme for a set of wireless network interfaces served by a VCD. Initially, during step 700 the VCD applies a threshold value, and a channel selection scheme, to the C/I metric values generated during step 602 to render one or more channels for each wireless network interface upon which data packets will be transmitted. By way of example, if a C/I metric for a channel is below an acceptable threshold, the VCD searches for a better channel for the same wireless technology and switches to that channel. In the case of wireless technologies that utilize multiple channels (e.g., Bluetooth or two network interfaces using the same wireless technology), the VCD determines a set of acceptable channels. Thereafter at step 702, if one or more of the wireless interfaces/technologies is experiencing unacceptable interference or congestion such that the channel selection step 700 failed to establish a satisfactory set of channels for the set of wireless interfaces administered by the VCD, then control passes to step 704.

At step 704, if an acceptable alternative wireless technology or network provider for a same technology (e.g., two different Wi-Fi network access point providers using different frequencies) can be found, then steps are performed to initiate switching to the alternative technology/network. In general, selection of an alternative wireless technology or network is performed in a way ensuring that the alternative technology/network meets base level functionality provided by the wireless interface/technology deemed unacceptable during step 702. For example, it is generally not desirable to switch to a network that does not provide as much connectivity or is less secure. Since the set of wireless technology interfaces has potentially changed, a new set of VCDs are determined for the computing device. An exemplary platform for applying a selection algorithm to a set of operating environment parameters to select a wireless technology/network is described herein below with reference to FIGS. 8-10.

If at step 702, the wireless network interfaces exhibit acceptable signal quality, then control passes to step 706. At step 706 the VCD initially makes a general selection between two coexistence scheme types: frequency adaptation and interface switching. In an embodiment of the invention, if frequency adaptation is available, then control passes to step 708. At step 708, the VCD designates a frequency range sharing coexistence scheme wherein the frequency range/channel used by any one of the set of wireless interfaces/technologies represented by the VCD is non-overlapping with any frequency range/channel used by any other wireless interface/technology in the set. When selecting the frequency range(s), a larger separation is preferred to a smaller separation in order to protect against signal bleed. Thus, by carefully selecting operating frequency ranges, transmissions by the set of wireless technologies can occur in parallel. Examples of such schemes are provided below.

Band Selection Between Co-located Technologies Adaptation

In one coexistence scheme designated during step 708, the adaptation task 410 attempts to eliminate interference by adjusting the set of channels/frequency ranges used by one or more of the competing technologies. For example, in the case of the VCD 320, which handles conflicts between 802.11b and Bluetooth transmissions, the adaptation task 410 designates a set of channels for an adaptive hop set utilized by the Bluetooth transmitter that is non-overlapping with a frequency range of a channel currently utilized by the 802.11b transceiver. Similarly, VCD 322 designates particular channels to be used by the UWB transceiver to avoid a channel currently being used by the 802.11a transceiver. Once the channels/frequency ranges have been determined by the adaptation task 410, the decisions are carried out through network interface driver-specific instructions issued by a Command/Control task 440.

If however, at step 706 frequency adaptation is not available, then control passes to step 710 wherein a transceiver switching coexistence scheme is designated by the VCD. In this case, the VCD regulates the flow of packets down to the wireless network interface drivers to ensure that data packets are not simultaneously transmitted within a same frequency range by the computing device.

Transceiver Switching Between Co-located Technologies Adaptation

If data traffic cannot be transmitted simultaneously by conflicting wireless technologies due to unresolved transmission channel overlap, then the VCD prescribes a time slicing mode of operation for a set of wireless network interfaces wherein each of the conflicting co-located wireless interfaces transmits data in mutually exclusive time frames.

The VCD configures a traffic sequencing scheme, in accordance with an aspect of the adaptation task 410, that is carried out by prioritization 420, queuing 430, and command/control 440 tasks described herein below. While operating within the traffic sequencing mode, data traffic for conflicting wireless technologies is regulated by the VCD to ensure that two conflicting channels are not simultaneously used by the computing device to transmit data packets. A traffic handling algorithm (described herein below) based upon, for example, C/I metrics, transmission priority, starvation time, driver delays, etc. establishes an order for transmitting pending data packets over the conflicting wireless technologies supported by the particular VCD instance.

Need-Based Transceiver Switching Between Co-located Technologies Adaptation

In a variation of the above-described transceiver switching scheme for handling conflicting wireless network interface technologies, the adaptation task 410 utilizes knowledge of when a particular wireless technology will be using a particular frequency band to implement a coexistence scheme that transmits in parallel at some points in time and sequentially during others (due to transmit frequency conflicts). In a particular example, involving co-located Bluetooth and 802.11b wireless network interfaces, the Bluetooth 1.0 interface hops over 79 channels, and each channel is 1 MHz wide. It therefore covers almost the entire ISM band 2.402 to 2.483 GHz. The 802.11b network interface uses 22 MHz of this band. Therefore a potential for conflict with 802.11b signal transmissions exists on 22 channels of the Bluetooth 1.0 interface.

The following coexistence scheme, specified by the adaptation task 410, takes advantage of concurrency when the Bluetooth interface is utilizing the remaining 57 non-overlapping frequencies. To facilitate implementing the above concurrency scheme, the virtual coexistence driver 320 determines/employs the hopping algorithm currently being used by the Bluetooth driver (a function of the clock and the MAC address of the master). When determining whether or not to hold off sending a packet because of a concurrent 802.11b transmission, the VCD determines whether a next hop interferes with the 802.11b transmission. If it is not, then concurrent Bluetooth and 802.11b transmissions are permitted.

In closing, with regard to FIG. 7, the above-described coexistence schemes are merely exemplary. The coexistence driver 300 architecture provides a highly flexible and open-ended architecture that supports designating virtually any type of coexistence scheme through VCD specifications associated with particular combinations of identified conflicting wireless technologies. For example, rather than organizing/queuing data packets by priority, in an embodiment of the invention, packets are arranged by application, source, wireless interface, by combinations of these and/or priority (e.g., high priority BT preferred over high priority 802.11, but low priority 802.11 over low priority BT), etc. Furthermore, the steps depicted in FIG. 7 are exemplary. In alternative embodiments of the invention wherein only one of the two general types of coexistence scheme types (frequency adaptation and interface switching) are supported by the VCD, then step 706 need not be performed.

Having described a general architecture of a coexistence driver that facilitates creation of virtual coexistence drivers for handling interference between two or more sources of wireless data transmission interference, attention is directed to a wireless network/interface selection scheme. Such scheme can be used at any of a variety of circumstances during the operation of a computing device that includes one or more wireless network interfaces capable of connecting to any one of multiple differing networks. For example, such selection scheme is potentially used to establish an initial connection. Furthermore, the selection scheme is utilized, after establishing an initial connection, to establish a new connection to a different network in accordance with changed operating parameters. While avoiding interference, addressed extensively herein above, is one reason to invoke the wireless selection method described below, the selection method is applicable to a variety of situations where two or more suitable networks/interfaces are available for reaching a particular resource. The selection scheme and resulting defined criteria potentially include factors such as: policy, network SSID, speed, congestion, interference, throughput, battery life, range, connectivity, security, cost per bit, and application throughput requirements. Each of these factors is described herein below with reference to FIG. 9. The exemplary wireless technology selection scheme described herein contemplates selecting a wireless technology based upon a variety of factors, regardless of whether the selection was necessitated by interference.

A series of four scenarios are discussed below that highlight the advantages provided by the proposed selection scheme when incorporated into a computing device capable of communicating via multiple differing interfaces with potentially multiple, differing networks. In each of these scenarios, the above-described coexistence driver (or other suitable module within the operating system or applications running upon a computing device) selects an interface/wireless technology that best meets a user's current needs.

Scenario #1

A user comes to work. He resumes his laptop running OUTLOOK and INTERNET EXPLORER. The WINDOWS operating system determines that it is in the vicinity of an overloaded 802.11a infrastructure network and an underused 802.11b network advertising the same network SSID (i.e., both offer connectivity to a same network). The operating system determines that the throughput requirements of the currently running applications are better met using the underutilized 802.11b than the overburdened and congested 802.11a access point. The operating system therefore utilizes an 802.11b network interface rather than an 802.11a network interface.

Scenario #2

A user opens a laptop in a packed airline lounge with many people using the lounge's 802.11a wireless network access point. The lounge also has an 802.11b network access point. Both network access points are free for the use by people in the lounge and provide the same kind of connectivity. The user is running OUTLOOK and IE on the laptop machine.

The operating system senses that the 802.11a network/access point is overloaded and congested. Also, the battery on the Patrick's laptop is running low. In response to the low battery power and the congested state of the 802.11a access point, the operating system selects the 802.11b connection to which it will connect. At some later time, the airline lounge empties, and the 802.11a network access point is no longer overloaded or congested. Furthermore, the battery has been charged, and power is no longer an issue because the user has plugged the laptop into a power socket. The operating system senses the changed environment, decides that 802.11a network offers the best service, and so changes wireless technology usage from 802.11b to 802.11a to take advantage of the higher bandwidth offered by the 802.11a connection.

Scenario #3

Two laptop users are in a cab on their way to a business meeting. They open their laptops and resume their Windows sessions. On resuming their sessions, they form an ad hoc group over a Wi-Fi network to share presentation material. The operating system on the first user's machine senses that there are two GPRS networks available for Internet connectivity; one is directly through a GPRS adapter in the laptop and the other one is through the first user's Bluetooth phone. The operating system selects the GPRS network through the Bluetooth phone since the policy on the first user's machine prefers that. However on using it the operating system senses interference on the Bluetooth connection to the phone arising from the Wi-Fi ad hoc network. The operating system therefore switches to the direct GPRS network in preference to the one through the Bluetooth phone.

Scenario #4

A user brings a laptop to the local library. The library offers Wi-Fi connectivity for browsing the library web site. There is no connectivity to the Internet. The user's laptop switches from the Wi-Fi to the GPRS network through the GPRS card in the laptop to gain access to the Internet.

As demonstrated by the above scenarios, selecting an appropriate network interface/network combination potentially takes into consideration a number of factors, including potentially avoiding interference. A wireless technology selection framework disclosed herein supports defining comprehensive, multi-factor, criteria that facilitate robust, dynamic, automated network interface/network selections on a computing device that potentially operates within a variety of wireless networking environments.

The exemplary interface/network selection framework and its variations, presented herein below comprise a wireless technology selection framework that is based upon acquired information elements, factor values, and selection criteria. The selection framework derives factor values from acquired information elements (e.g., network status/capabilities) relating to multiple combinations of interface/network combinations available to a computing device. The factor values derived for each of the available combinations are then applied to an interface/network selection criterion. The criterion, by way of example, comprises a logical/arithmetic combination of weighted factor values. Applying the derived factor values for each interface/network option to the selection criterion renders a resulting interface/network selection for wireless network communications. In an exemplary embodiment, factor values are applied to an interface/network selection criterion to select between two Wi-Fi technologies, 802.11a and 802.11b supported by a portable (e.g., notebook) computing device. However, the disclosed selection framework is suitable for selecting between any of a variety of wireless technologies, including for example, selecting between Wi-fi (e.g., 802.11a/b/g) and GPRS interfaces/networks.

Embodiments of the selection framework incorporate a number of dynamic aspects. In a first aspect, the factor values applied to a particular criterion change over time. For example, signal strength of a transceiver associated with a wireless access point can change over time and influence an overall desirability score assigned to a contemplated interface/network combination.

In a second aspect, the particular criterion governing wireless interface/network selections is dynamically configured according to sensed operating conditions (e.g., battery power high/low). In a first example of dynamically configuring a criterion, a criterion selection rule/algorithm determines which criterion, of a set of wireless selection criteria, will be used to select an interface/network to which a wireless connection will be established/maintained. Thus, by way of example, a first criterion is used when a computing device is operating with a substantially high level of stored battery energy, a second criterion is used when a battery's stored energy is low. In a second example of dynamically configuring a criterion, weights attributed to various factors within a criterion change based upon sensed operating conditions. Thus, by way of example, a set of factor weights are specified for a particular application. When the application is launched, the factor weights are loaded into a criterion shell. Thereafter, factor values are applied to a resulting application-specific criterion to render an interface/network selection.

Figure 8:
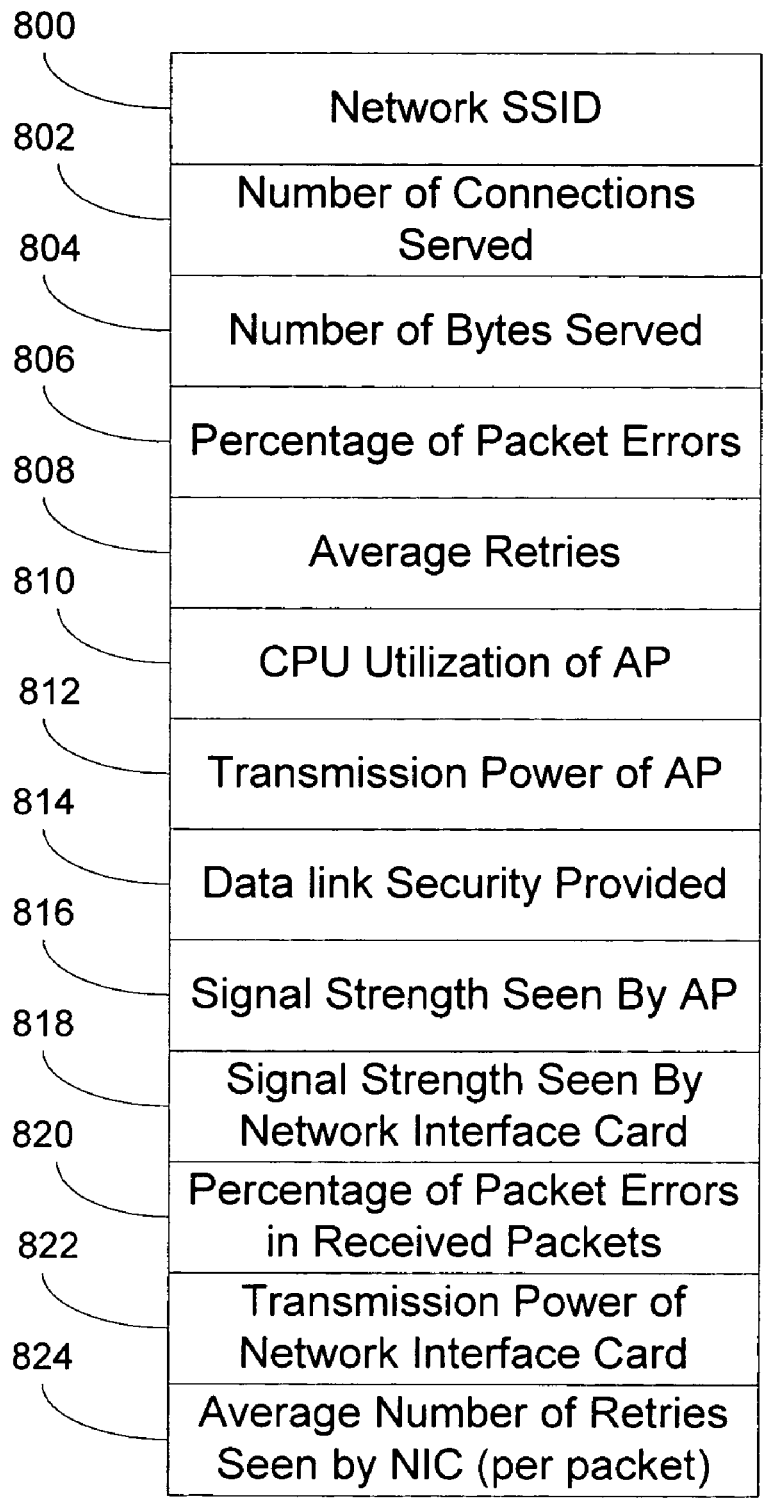
FIG. 8 identifies a set of information elements potentially used by a wireless network technology selection criterion.
Figure 9:
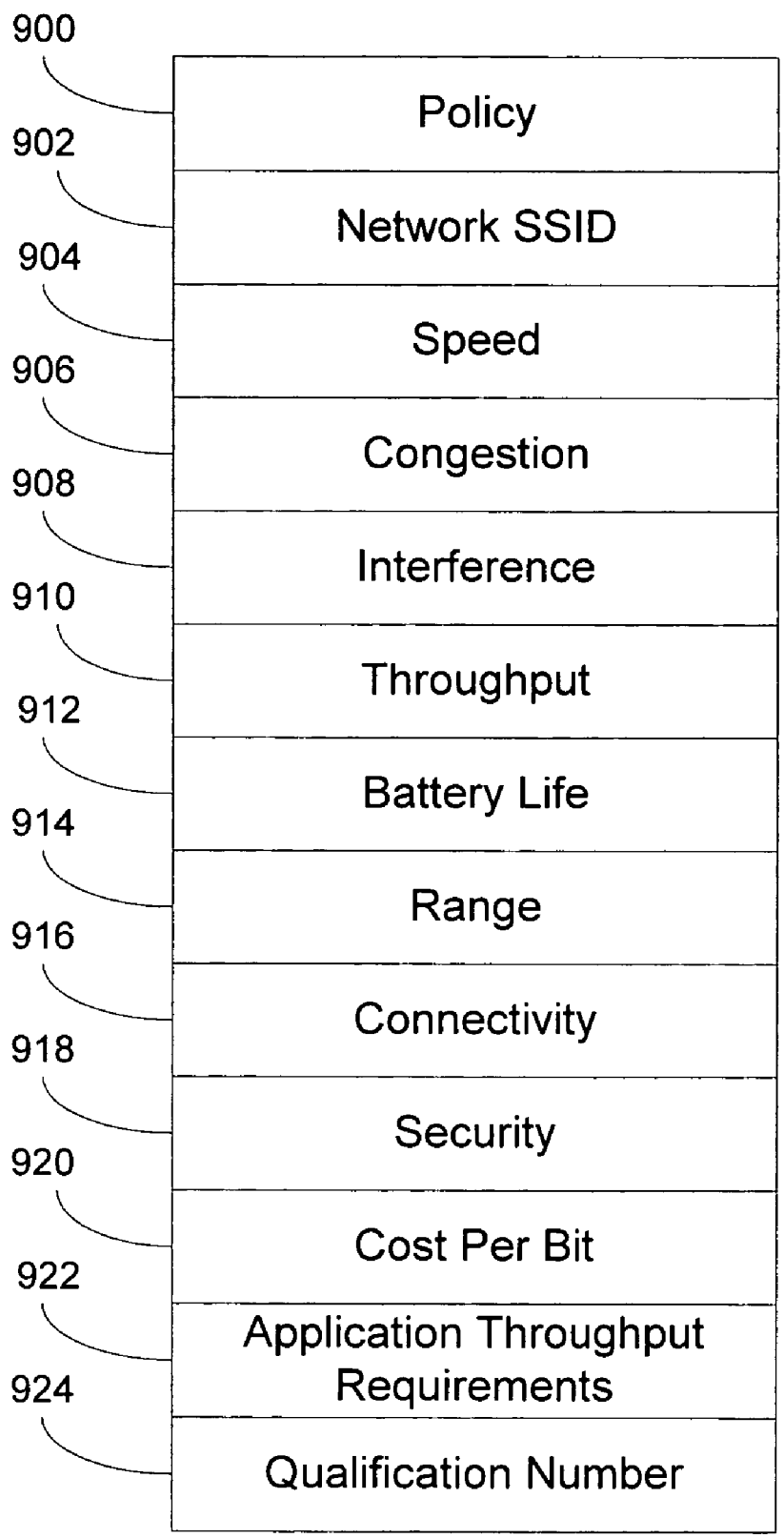
FIG. 9 identifies a set of factors utilized by wireless network technology selection criteria.

The factor values, in an embodiment of the invention, are derived from information elements of many types. Turning to FIG. 8, an exemplary set of information element types is enumerated. A network SSID 800 identifies a network. An Ncap 802 specifies a number of connections serviced in the last 't' units of time by an access point. A connection is a synonym for an active association. A computing device communicates using a connection. An Nbap 804 specifies a number of bytes processed in the last 't' units of time by the access point. A Perrpap 806 specifies a percentage of packet errors in the last 't' units of time in received packets by the access point. A Pretppap 808 specifies an average number of retries in the last 't' seconds per packet by the AP across all nodes that it is servicing. A CPUap 810 parameter specifies a level of CPU utilization at the access point. A TPap 812 specifies a transmission power, in milliwatts, being used by the access point. A DLSec 814 specifies a wireless data link security type provided on the wireless network.

The set of parameters potentially used by a wireless technology/network selection criterion includes information elements associated with a wireless network interface card through which a connection is potentially established with a network. An SSap 816 specifies a signal strength seen by the access point. An SSsta 818 specifies a signal strength seen by the network interface card. A Perrpsta 820 specifies a percentage of packet errors in packets received by the network interface card. A TPsta 822 specifies a transmission power used by the network interface card. A Pretppsta 824 value specifies an average number of retries per packet seen by the network interface card during the last 't' seconds. In the above, description of the parameters, the value "t" is a period interval specified in seconds.

Having described a set of exemplary parameter values that potentially contribute to a wireless technology/network combination selection procedure, the discussion that follows provides further details regarding the selection criteria supported by the wireless technology selection procedure. As a preliminary matter, suffixes a and b are added to the above-identified parameter acronyms to designate either 802.11a or 802.11b, respectively.

Before discussing a set of wireless criteria presented herein below, a set of terms/abbreviations are introduced/defined.

Wireless Criterion Factor (WC)—A parameter or attribute of a computing device/user station (STA), access point (AP), or of the network formed by the STAs and APs. This parameter is used, for example, as a data point to select between 802.11b and 802.11a. A Wireless Criterion Factor can be Critical, Overriding, or Non-Overriding. A Critical criterion factor is always overriding over all others. An Overriding criterion factor may or may not be critical.

Overriding Criterion Factor (OWC)—This is a criterion factor that overrides all non-overriding criterion factors. There can be more than one overriding criterion factors. In cases where two or more conflicting overriding criterion factors exist, the higher priority criterion factor controls selection. No two overriding criterion factors can have the same priority.

Non-overriding Criterion Factor (NOWC)—This is a criterion factor that is neither critical nor overriding.

Critical Criterion Factor (CWC)—This is a critical criterion factor to the decision process that results in a wireless interface/network selection. If a wireless technology does not have an acceptable value for this criterion factor, it is eliminated from consideration. A critical criterion factor by definition is the most preferred overriding criterion factor. There can be only one critical criterion factor.

Wireless Criterion Factor Weight (WCW)—A wireless criterion factor weight represents the relative priority/importance assigned to a criterion factor. The weight is a relative number. The weight is provided, for example, by the user through a user interface or preset for the STA (computing device) by a department that manages the STA. In an exemplary embodiment, the WCW is in the range from 1-10 with 1 being lowest and 10 being the highest. The WCW for a criterion factor is established relative to the WCW values assigned to other criterion factors.

Wireless Criterion Factor Value (WCV)—The observed value of a criterion factor. By way of example, it is a number in the range 1-10 with 1 being the lowest and 10 being the highest. A low or high value can mean good or bad based on the criterion factor. For example, a high value for "Congestion" is bad (e.g., a negative factor weight is used when formulating a criterion comprising multiple weighted factors and values) whereas a high value for a "Throughput" factor is good.

Detailed Description of Exemplary Wireless Criteria

Having described a set of parameters and terms utilized to define wireless technology selection criteria according to a wireless technology selection framework described herein, representative factors and overall quality score (enumerated in FIG. 9) that influence wireless technology/criteria selection are now described for selecting between 802.11a and 802.11b wireless technologies. The factors described herein below are derived from the information elements described herein above with reference to FIG. 8.

Policy 900: specifies a set of criteria available to a user/client to decide between technologies/interfaces/networks. A criterion within the set of criteria specify one or more factors and associated weights for making a selection. The policy 900, by way of example, is downloaded as part of client provisioning. In the absence of policy provisioning, a default policy is used.

Network SSID 902: specifies a network identification. The station acquires an SSID of a network from a beacon periodically transmitted by an access point, or from a probe response sent by the wireless AP to a probe request from the STA. The SSID identifies a network. In a simple interface/network selection criterion, if the STA receives a same SSID on 802.11a and 802.11b channels, then all else being equal, the 802.11a channel is selected.

Speed (SPD) 904: specifies a theoretical maximum speed offered by a particular wireless technology. In a simple criterion wherein only the speed 904 is considered, then if a selection is made between 802.11a and b technologies, then 802.11a is selected over 802.11b—even if an excessive number of current 802.11a users results in greater individual throughput via the 802.11b technology. However, the present invention contemplates/supports significantly more complex/robust decision-making involving multiple factors that avoid such short-sighted decision-making.

Congestion (CNG) 906: specifies a congestion value on a particular wireless technology of interest. If Ncap 802 or Nbap 804 for a particular wireless technology is large and if both Pretppsta 824 and Pretppap 808 are large, then it is likely that there is a relatively high level of congestion on the particular wireless technology/network combination. In other words, if the access point associated with a particular wireless technology/network is heavily loaded, i.e. it is handling a large number of connections or processing a large amount of traffic from existing connections, and the number of retries for packets at the AP and STA are high, then it is very likely that the network is congested. If the same access point provides 802.11b and 802.11a service, both 802.11a and 802.11b will likely be equally affected by the load. In this case, Pretppsta 824 and Pretppap 808 determine the congestion state of the network. A WCW value of 1 indicates, for example, a lowest congestion state, 5 is normal (medium), and 10 is the highest (network is stressed) level of congestion.

Interference (INTF) 908: specifies a level of interference. If both Ncap 802 and Nbap 804 are small but either one or both of Pretppsta 824 and Pretppap 808 are high, then a high level of interference likely exists. In other words, if the access point is not heavily loaded, i.e., the number of connections and the level of traffic processed by the access point is low to medium, but a larger than normal number of packet errors and retries exist at both the access point and the STA, then it is likely that interference exists on the network from other sources. Sources of such interference potentially include cordless phones, microwaves, and other devices using the same band as Wi-Fi technology under consideration. A WCW value of 1 indicates a lowest level of interference, 5 is normal (medium), and 10 is the highest (excessive interference).

Throughput (THRPT) 910: specifies throughput of a particular wireless technology. If both SSap and SSsta (signal strengths for the AP and STA) are low, then data throughput, by implication, is low. If both are high, the data throughput is high. If throughput on 802.11a is less than it is on 802.11b, then the throughput factor 910 favors the 802.11b wireless technology. In an exemplary embodiment of the invention, a weight (WCW) is given to the throughput 910 parameter based on the requirements of particular applications running on the STA. For example, if Audio/Video streaming applications are running, a higher weight than normal should be used. A factor value (WCV) of 1 indicates low throughput, 5 is normal, and 10 is high. By way of example, under ideal conditions, when comparing 802.11b and 802.11a technologies, 802.11b technology (highest theoretical speed can be 11 Mbps) receives a value of 5 and 802.11a (highest theoretical speed can be around 25-30 kbps) receives a value of 8, or even a value of 10 for turbo mode with highest theoretical speed of around 50 kbps.

Battery life (BL) 912: specifies battery charge available for a STA. By way of example, when comparing power drain from wireless network interfaces, an 802.11a NIC, for the same work load, consumes more power than an 802.11b NIC. Therefore, a low battery power is assigned greater (negative) weight for the NIC that consumes more power. Furthermore, if battery charge level on a STA is low, then the weight (WCW) given to the battery life 912 factor is raised regardless of the technology—reflecting the increased importance of this factor. The value (WCV) assigned to the battery life 912 goes from highest (least negative) to lowest (most negative) across UWB, BT, 802.11b, 802.11a wireless technologies.

Range (RNG) 914: specifies a relative distance for each technology. 802.11b's range is 150-300 feet and 802.11a's range is roughly a quarter of 802.11b's range. As a result a STA that is moving will experience more handoffs if the 802.11a wireless technology is used. Handoff, in turn, affects latency, jitter, and packet loss. Fast handoff schemes are employed to make handoff as seamless as possible. However, low limits on latency, jitter, and packet loss for Voice over IP and A/V streaming applications require minimal handoffs for optimal user experience. A proper weight (WCW) is given to the range 914 factor based on the requirements of applications running on the station and the kind of mobility of the computing device (STA) itself. As an example, for a wireless, non-mobile, desktop machine the Range 914 factor has minimal, if any, weight. On the other hand, the Range 914 is given a higher weight for a handheld (highly mobile STA) computing device that is currently running either a VoIP or A/V streaming application.

Connectivity (CON) 916: specifies a measure of connectedness to resources via a wireless interface. If a STA is aware, from earlier saved experience, of the kind of connectivity provided by certain 802.11a and 802.11b networks at a particular location, it can select (or apply a high factor value to) a network that provides better connectivity. In the absence of any indications to the contrary, two Wi-Fi technologies such as 802.11a and 802.11b advertising the same SSID offer similar connectivity. For the case where a station is already using an 802.11a NIC or an 802.11b NIC for ad-hoc communication or for connectivity to a different SSID, it can not re-use the same NIC for the SSID to which it seeks to connect. In such circumstances, the choice is clear.

Security (SEC) 918: specifies a relative level of security available via a particular technology/network combination. The STA can determine the security offered by a wireless network by piecing together the following information: privacy bits on the beacon and the security mechanism offered at the data link and network layer. If the security offered by the 802.11b network is conformant to a policy on the STA while that offered by 802.11a is not, then the 802.11b network is selected. In other instances, security 918 is a factor, but not an overriding factor in a selection criterion. In a particular example of a selection criterion, if the security offered by both 802.11a and 802.11b is conformant to the policy on the client, then the particular Wi-Fi technology that employs a more preferred security mechanism is preferred.

Cost per bit (CST) 920: specifies a cost for using a particular access point/link. The CST 920 may be indicated, for example, in a beacon sent by an access point or, alternatively, by a higher layer protocol used by an edge server (an access server sitting on the critical data path behind access points) or by a provisioning server. In an exemplary criterion, the CST 920 is an important factor (i.e., it is designated as having a high weight or alternatively receives an overriding or critical logical designation). Therefore if CST for 802.11a is unacceptable and CST for 802.11b is an acceptable value, and no other factor overrides this determination, then the 802.11b interface is selected.

Application throughput requirements APPTHRPT 922: specifies a throughput needed by one or more particular active applications on a computing device to ensure proper operation of the applications on the device (STA) that will utilize the selected wireless technology. The STA determines the throughput requirements of the applications running on it based on quality of service attributes set by the applications. By way of example, in an energy conservation mode of operation, a criterion specifies that if the throughput requirements of the applications can be satisfied by 802.11b and there is no other factor, such as CST for instance, overriding this factor, then the 802.11b wireless technology is selected.

A Qualification Number (QN) 924 is an overall measure of the quality of a wireless technology/network combination. The QN=$\Sigma$WCW[i]*WCV[i] i.e. the sum of weighted WCVs of the different criteria The QN 924 value is determined using a selection algorithm specifying, by way of example, any of the above factors and corresponding weighting for each (including potential overriding factors). Once the QN 924 value of each available wireless technology/network combination has been determined, the technology with the highest QN is used. Alternatively, a criterion comprises a set of logical filters that result in a set of qualified combinations. Thereafter, a QN is generated for each qualified combination to determine a final selection of technology/interface/network combination for carrying out wireless communications for the device.

In an embodiment of the invention, a limit is placed upon the frequency with which the computing device generates new QN values for the computing device. The QN is determined periodically (according to a configurable repetition period) and on the occurrence of any significant event such as media connect/disconnect, a significant change in data received from a network interface card regarding an access point, or the start of a particular application. As will be explained further herein below with reference to FIG. 11, upon the occurrence of such events, the selection logic is invoked to re-evaluate a previous technology/interface/network combination selection in view of potentially new information element data and resulting factor values/weights.

It is noted that with regard to criterions that rely at least in part upon logical filters (that establish threshold requirements), a policy potentially specifies a particular criterion incorporating one or more factors as an overriding basis for selecting a particular wireless technology. In such a case, selecting a particular technology/interface/network combination is simplified because in cases of conflicts between two or more overriding factors, the lower priority conflicting factor is eliminated from consideration. Also, if one of the two wireless technologies provides an acceptable value for a critical factor while another does not, the technology for which the value for the CWC is not acceptable is eliminated from consideration. For instance, if SEC 918 is a critical factor, then if a SEC value of one wireless technology is acceptable while that of the other is not, the choice is clear. The QN assigned to a rejected wireless technology is zero.

If there are two or more overriding factors and they conflict, the one deemed more important, as established for example by a preset policy on the STA, is used. Furthermore, policy specifications are sufficiently rich to state, in cases where the minimum or maximum acceptable value for an overriding factor is not met by any interface, then the STA alerts a user, prompts the user, and accepts a manual selection in view of the unacceptable current status.

It is noted that an illustrative system incorporating the above-described selection framework can also employ dynamic learning in that the system keeps a history of user selections for ambiguous situations that are subsequently resolved through user input, and, if allowed by the policy, chooses to use this history of past user selections to resolve similar ambiguous situations in the future.

Figure 10:
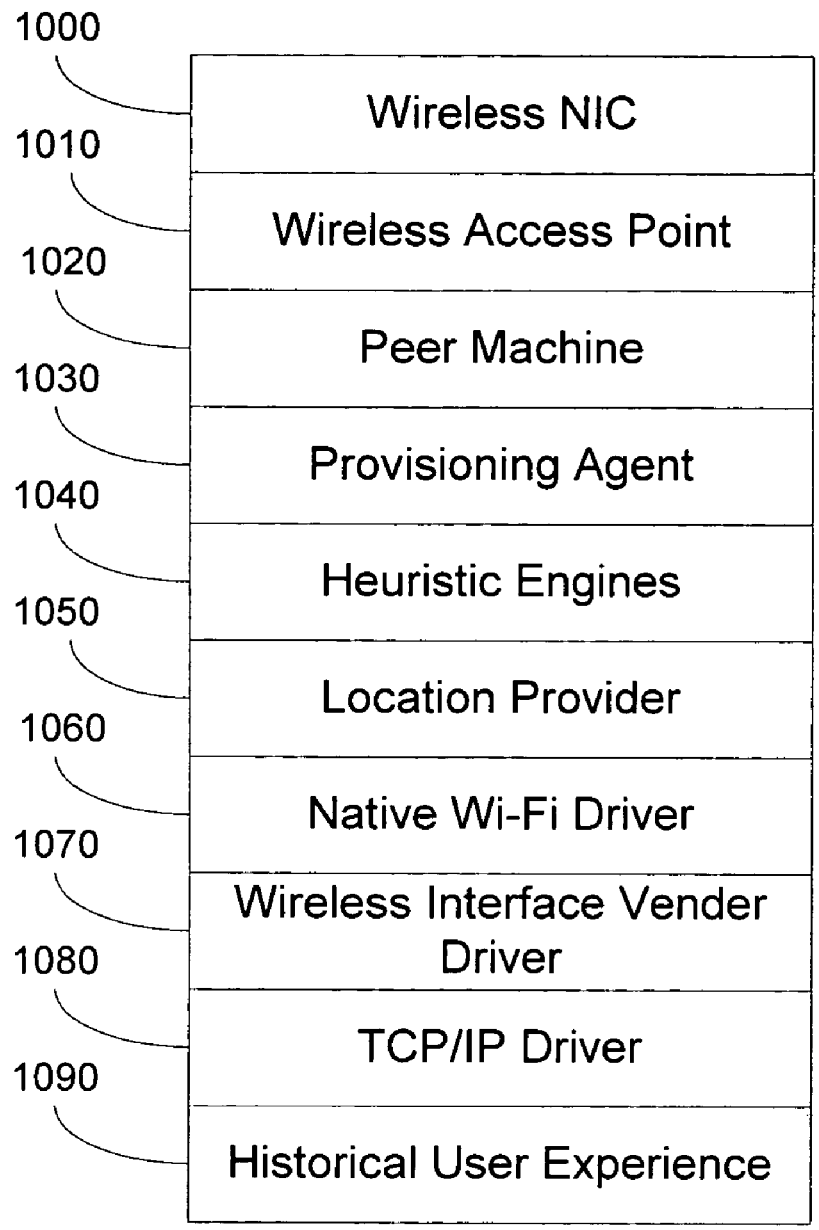
FIG. 10 identifies a set of sources for wireless information and criteria in accordance with exemplary embodiments of the present invention.

The information elements and selection criteria are acquired from a variety of sources. Turning to FIG. 10, a set of information element sources are identified. To determine values of some of the identified factors utilized by the wireless technology criteria, the computing device acquires information elements from a variety of sources including, by way of example: a wireless network interface card 1000, a wireless access point 1010 to which the network interface is connected, a peer machine 1020, a provisioning agent 1030, heuristic engines 1040, a location provider 1050, native Wi-fi 1060, wireless network interface vender drivers 1070, higher level (e.g., TCP/IP) network drivers 1080, and previously recorded historical user experiences 1090. This list of sources of information and criteria that drive the selection process provided above is intended to be illustrative. Also, the present invention contemplates using global information such as priorities of data sets as set, for example, by an administrator through a management tool and/or by applications.

The following describes the types of information provided by the above-mentioned sources of information/criteria that drive the technology/interface/network selection process of a computing device embodying the present invention. The wireless NIC 1000 maintains a variety of statistics concerning the operation of the hardware including: signal strength, bit transmission errors, etc. The wireless access point 1010 provides current capabilities and congestion statistics informing users of its present ability to handle current/additional workload. The peer machine 1020 that is located in the same proximity is a potential source for conveying any of the information maintained by the computing device. Thus, in the case where the peer machine 1020 has been acquiring relevant information for significant period of time, and the computing device running the selection algorithm is relatively new, the peer machine 1020 conveys the information via a convenient connection that can be formed with the computing device. A provisioning agent 1030, associated with a wireless provider, is a potential source for both information and criteria (and weights). In such case, the computing device establishes a connection to the provisioning agent—potentially without the aid of a selection criterion. Thereafter, the provisioning service specifies a URL of the provisioning agent 1030. The provisioning agent 1030 interacts with the computing device (and user) to download a policy including one or more selection criteria implemented, for example, by the coexistence driver 300. The location provider 1050 identifies locale information for the computing device that executes the selection criteria. Such locale information is potentially used to look up potential resources within a directory or other location-sensitive information that drives technology/interface/network selection by the computing device. The native Wi-fi 1060 provides statistical information accumulated from the operation of 802.11 interfaces currently installed on the computing device. The vender drivers 1070 provides information that is similar to native Wi-fi 1060, but is customized to operational statistics associated with the particular driver such as the average number of retries in the last 't' seconds to send a packet or the percentage of packet errors in received packets. TCP/IP drivers 1080 provide statistics relevant to higher level processing of network messages such as whether connectivity is available to a resource over a particular network interface The historical user experience data 1090 includes previous selections made by a user. Such information can also include a record of particular factor (or underlying information element) values that were present when the user made the previous selections. The historical user experience data 1090 thus supports predictive modeling that seeks to automate the selection process based upon consistent user responses under particular circumstances. For example, if a user consistently selects 802.11a technology when running a particular application, then that information is potentially used to predict (or give greater weight to) that technology when the application is running.

Heuristic engines 1040 comprise an extensible class of modules incorporated into the selection framework that generate derivative information elements from input data provided by other information sources. Examples of derivative information generated by the heuristic engines 1040 include determining congestion and interference levels.

In an embodiment of the invention, the coexistence driver 300, or alternatively a separate decision-making module that provides connection selection services, acquires the information from the multiple sources and generates a selection. Furthermore, it is noted that in exemplary embodiments of the invention, acquiring the information element data and executing the selection procedures are event driven. Such events are generated in response to status changes monitored by the coexistence driver 300 (or some other notification service). In other cases, the events are driven by a periodically invoked task registered, by way of example, with a "timer driven" task scheduling service provider in the operating system. Furthermore, the weights assigned to various factors within selection criteria are reassigned in response to events (e.g., de-installation or disabling of an application, battery power running low, a change in the number or types of available networks, a change in congestion/interference parameter values, a change in connectivity of a network, etc). After completing the reassignment, an event is registered thereby prompting re-applying a criterion to each of a set of currently available network interfaces/networks.

Figure 11:
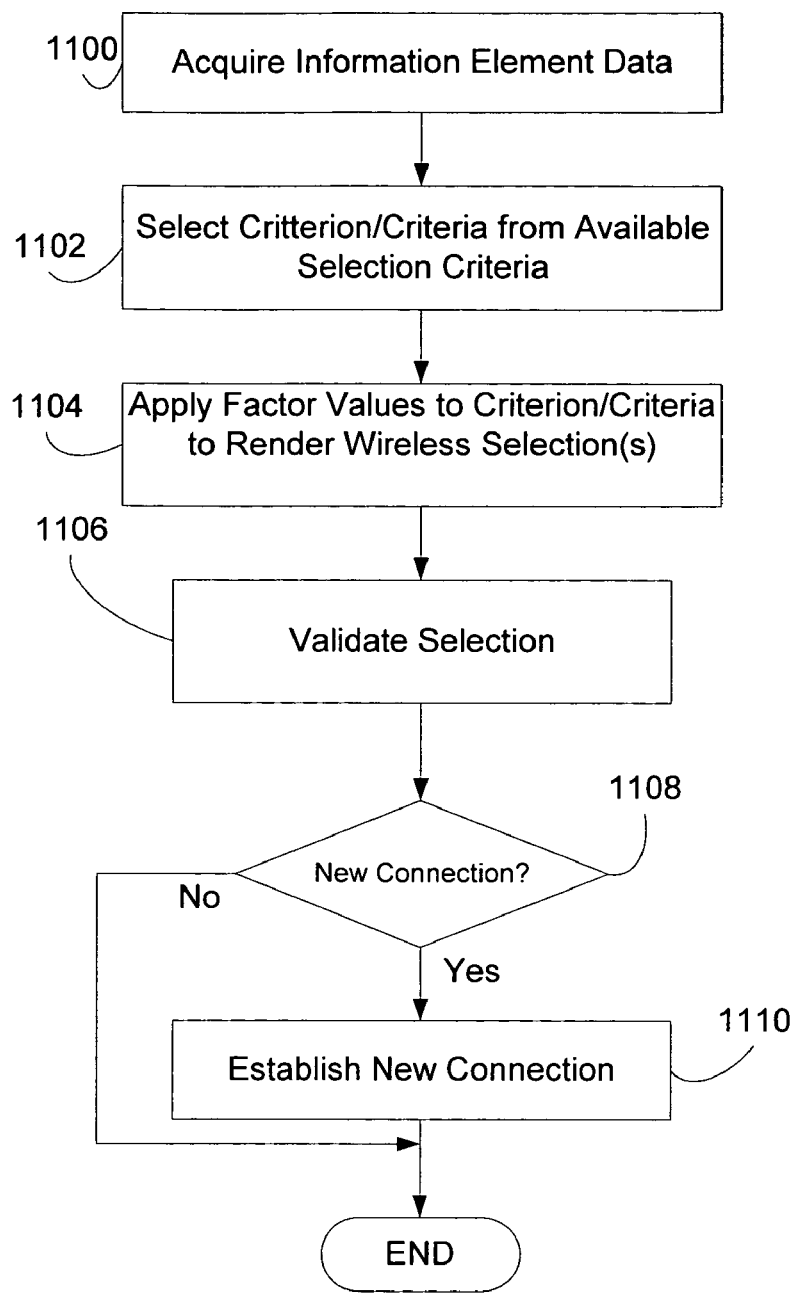
FIG. 11 summarizes a set of steps carried out by a computing device to implement wireless technology/interface/connection selection in accordance with an exemplary embodiment of the present invention.

Turning to FIG. 11, a set of steps executed by a computing device incorporating the wireless technology/interface/network selection platform described herein above are summarized. As mentioned previously above, the steps of FIG. 11 are generally not continuously performed. Rather, they are invoked upon the occurrence of an event (e.g., a scheduled update task, an change in status of a critical factor, factor weights modified, etc.)

Initially, during step 1100 the computing device acquires information elements that form the basis for generating factor values. While depicted as a single step, in an embodiment of the invention step 1100 is performed at many points in time through the operation of a variety of information element sources.

At step 1102 one or more of the multiple available selection criteria are selected. In an embodiment of the invention the section is driven by a user interface. However, in other embodiments, the selection step 1102 is performed, at least in part, by criterion selection logic that responds to particular sensed information to select an appropriate criterion (including factor weights that complete the criterion specification).

At step 1104 factor values, derived from the information elements acquired during step 1100, are applied to one or more criteria selected during step 1102 for each available technology/interface/network combination. In an embodiment of the invention, step 1104 is interrupted and a dialog box is generated to resolve logic errors that prevent completing a decision-making process for selecting a particular technology/interface/network combination for a connection. Such errors include, for example, the presence of two factors within an applied criterion (or criteria) that give conflicting selections. Based upon the results from applying the acquired information to the criterion/criteria (and potentially further user input), one or more of the available technology/interface/network combinations is/are designated.

In an embodiment of the invention, at step 1106 a user is requested to validate the criteria-based selection. By way of example, such notification is provided in the form of a dialog box that contains one or more suggested selections. In the case where multiple suggestions are provided, the choices are ranked according to the results of step 1104. In an alternative embodiment of the invention, step 1106 is by-passed. In that case, the selection is automatically carried out without validation by a user.

Thereafter, at step 1108, if the selected technology/interface/network selection differs from one currently being used by the computing device (which includes no current connection), then control passes to step 1110 wherein a new connection is established based upon the previous selection. Implementation of step 1108 can occur in any of a number of ways and should not be viewed as limiting the invention in any way. However, to the extent available, such connection creation operations are automated to the greatest degree possible to provide the best user experience. Control then passes to the End. If however, the existing connection is the same as the one validated at step 1106, then control passes from step 1108 to the End (there is no need to establish a new connection).

Exemplary Criterion for Selecting Between 802.11a/b Wireless Technologies

The following pseudo-code specifies an exemplary criterion for selecting between 802.11b 802.11a wireless technologies. This example demonstrates how to use the above-described information elements and factors to implement wireless technology/network selection criteria. The criterion does not take into account overriding disposition of a factor except for considering SEC (security) as a CWC (critical wireless criterion/factor). However, modification of the example to incorporate overriding factors is contemplated in alternative criteria. Furthermore, the present invention contemplates specifying criteria selecting between a variety of technologies including, by way of a further example, selecting between 802.11a and UWB wireless technologies and corresponding networks embodying these technologies.

Some acronyms used in the pseudo code are given below:

```
HPOWC - higher priority OWC
INT SelectBestWiFi( )
{
//
//there has to be a match with the SSID
//
if (both 802.11a && 802.11b offer the desired SSID)
{
    QNb = 0; QNa = 1;   // QNs reflects speed (SPD)
                        //advantage of 802.11a over 802.11b
    //
    //if 802.11a is already in use, it is not considered
    //
    if (CON of 802.11a) == ADHOC
    {
        QNb++, QN=0;
        if (CON is HPOWC) return; //802.11b qualifies
    }
    else //either of the Wi-Fi technologies can be used
    {
        //
        //if SEC of 802.11a is non-conformant,
        //
        if SECa is non-conformant
        {
          if SECb is conformant
              QNb++; QNa = 0;
          else
              QNa = QNb = 0; //both are non-conformant
        }
        else // SECa is conformant
        {
          if SECb is non-conformant
              QNa++; QNb = 0;
          else //both SECa and SECb are conformant
          {
             QNa++; QNb++;
          }
        }
    }
    if (SEC is CWC && (QNa == 0 || QNb == 0)) return;   //let QN values decide;
                                                        //if both QNs are 0; let user
                                                        //decide
    //
    //If congestion on 802.11b is less than on 802.11a
    //
    if (CNGa − CNGb) > acceptable difference
```

```
        QNb++;
     else
        QNa++;
     if (CNS is HPOfRemOWC) // if CNG is the highest priority
         return;
     //
     //If interference on 802.11b is less than on 802.11a. The acceptable threshold takes
     //into account the inherent bias against 802.11b on account of the crowded spectrum
     //
     if (INTFa – INTFb) > acceptable difference
        QNb++
     else
        QNa++;
     if (INTF is HPOfRemOWC)
         return;
     //
     //If throughput on 802.11b is less than on 802.11a.
     //
     if (THRPTa > THRPTb) QNa++;
     else if (THRPTb > THRPTa) QNb++;
     if (THRPT is HPOWC) //NYCP is not yet considered parameters
         return;
     //
     // If battery life left is low, reflect that in QN
     //
     if (BL is low) QNb++;
     //
     // Reflect range advantage of 802.11b for interactive, voice, and a/v streaming apps in
     //the QN
     //
     if (APP is INTERACTIVE or A/V and STA is MOBILE) QNb++;
     //
     //If cost for using 802.11a is more as determined from the network, reflect that in QN
     //
     if (CSTa >> CSTb) QNb++;
     else if (CSTb >> CSTa) QNa++;
     //
     //If app throughput requirements are satisfied by throughput on 802.11b, select it
     //
     if (APPTHRPT < THRPTb)
     {
     QNb++;
     }
     else
     {
         if (APPTHRPT < THRPTa)
         {
             //
             //Since APPTHRPT can not be met by THRPTb, QNb goes down
             // significantly
             //
                 QNb –= 2
         }
     }
}
else //one or both do not offer the desired SSID
{
    QNa = QNb = 0; //start with a clean state
    //
    //select technology that provides the desired SSID
    //
    if (SSIDa == desired SSID) {QNa++; QNb = 0;}
    else if (SSIDb == desired SSID) {QNb++; QNa = 0;}
}
return;
} //end of SelectBestWi-Fi
```

Having described an example criterion for wireless network technology selection based upon a set of factors, a number of observations are provided herein below that build upon the example. An advanced wireless user interface option on a STA allows a user to specify weights/preference order for the above described factors with the ability to specify one or more of the factors as overriding criteria/factors—and one factor as critical. If two or more factors are marked as overriding, then their weights must differ. The user indicates, through another option, whether the STA should prompt the user for confirmation if the acceptable limits for a critical factor are not met. The policy 900 is settable using a station user interface as well as through group policies. Policies should be environment/location sensitive because the relevance/weight of factors is likely to vary based upon the environment/location of the computing device such as work, home, and public networks. For example, the cost per bit 920 factor value is assigned a weight of 0 for the work environment, but a higher weight is assigned for a public access point. Likewise, the SEC 902 factor is treated with different degrees of importance based on the location. In the absence of any policy or the user manually configuring a policy, a default policy drives wireless network technology/network selection.

Switching between technologies is transparent to a user. Therefore, if 802.11b is selected as the preferred connectivity technology based on a value for the QN 924, and it is later determined, as indicated by a change in the value of the QN 924, that 802.11a should be used (or vice versa), the computing device seamlessly transitions to the selected technology. Regardless of whether or not the two wireless technologies provide connectivity to the same subnet, the migration process from one wireless technology to another are transparent to applications running on the computing device. If the wireless technologies connect the computing device to different subnets, mobility support within the operating system, if existent, keeps the transition from one subnet to the other transparent to the applications. In an exemplary embodiment, whether to switch on the fly between different subnets, assuming it is known from historical data that the wireless technologies connect to different subnets, is part of the policy.

It will be appreciated by those skilled in the art that a new and useful method and framework for facilitating configuration/selection of one or more modes of wireless network access have been described herein. More particularly, the wireless network interface selection and coexistence driver architecture described herein facilitates automated selection of a particular mode of network access based upon status information provided by a set of network interface drivers associated with particular network interfaces and wireless technologies. Furthermore, a criterion-driven interface/network selection framework has been described that is potentially invoked in a variety of situations including when an application is invoked or, as described above, to select another interface/network to avoid detected interference.

In view of the many possible computing environments to which the principles of this invention may be applied and the flexibility of carrying out automated network access configuration to address interference and any other coexistence issues that arise when wireless data communication is contemplated, it should be recognized that the embodiment described herein is meant to be illustrative and should not be taken as limiting the scope of invention. Those skilled in the art to which the present invention applies will appreciate that the illustrative embodiment can be modified in arrangement and detail without departing from the spirit of the invention. Therefore, the invention as described herein contemplates all such embodiments as may come within the scope of the following claims and equivalents thereof.

What is claimed is:

1. A method for selecting a wireless technology among multiple available wireless technologies on a computing device having at least one transport driver and a plurality of network interface drivers, each network interface driver for establishing a network connection using an available wireless technology of the multiple available wireless technologies, the method comprising the steps of:
    maintaining a wireless technology selection framework comprising a set of factors;
    receiving, via a user interface, one or more inputs to the wireless technology selection framework to designate an overriding factor and a non-overriding factor;
    acquiring a set of information regarding the status and/or capabilities associated with each available wireless technology;
    dynamically rendering numerical factor values for the factors based at least in part upon the information acquired, wherein the numerical factor values are different from the information acquired;
    defining and storing in at least one computer memory a set of wireless technology selection criteria, wherein one or more of the factors are referenced in at least one criterion;
    dynamically choosing one or more criteria from the set of criteria, comprising evaluating a criterion selection logic based on the information acquired; and
    rendering a wireless technology selection based at least in part upon applying the numerical factor values to the chosen wireless technology selection criteria, comprising giving precedence to the overriding factor over the non-overriding factor, further comprising calculating an arithmetic combination of the numerical factor values.

2. The method of claim 1 wherein the rendering a selection step further comprises applying global information to the chosen wireless technology selection criteria.

3. The method of claim 2 wherein the global information includes priorities of data sets.

4. The method of claim 1 wherein the wireless technologies comprise at least 802.11a and 802.11b wireless technologies and the chosen criteria involve a network congestion factor.

5. The method of claim 1 wherein the wireless technologies comprise at least 802.11a and UWB wireless technologies and the chosen criteria involve a signal interference factor.

6. The method of claim 1 wherein the wireless technology selection framework further supports designating a set of weights applied to the factors and the wireless technology selection criteria comprise logical and/or arithmetic combination of weighted numerical factor values.

7. The method of claim 6 wherein the weighted numerical factor values are combined to render an overall selection score for each combination of available wireless technologies.

8. The method of claim 1 further comprising issuing a prompt for user intervention when no available wireless technologies meet a requirement designated by at least one of the chosen criteria.

9. The method of claim 6 further comprising providing an interface through which a wireless technology selection criterion is configured dynamically by designating factors and/or weightings.

10. The method of claim 6 wherein the rendering a selection step is performed in response to an event.

11. The method of claim 10 wherein the event comprises expiration of a period.

12. The method of claim 10 wherein the rendering a selection step is performed in response to an event associated with reassigning a weight to a factor referenced within a wireless technology selection criterion.

13. The method of claim 12 wherein the reassigning a weight is carried out in response to a detected event.

14. The method of claim 13 wherein the detected event corresponds to a change to a status of an application currently executing upon the computing device.

15. The method of claim 13 wherein the detected event concerns a power source for the computing device.

16. A computer storage medium including computer-executable instructions that facilitate selecting a wireless technology among multiple available wireless technologies on a computing device having at least one transport driver and a plurality of network interface drivers, each network interface driver for establishing a network connection using an available wireless technology of the multiple available wireless technologies, the computer-executable instructions facilitating performing the steps of:

maintaining a wireless technology selection framework comprising a set of factors;

receiving one or more inputs to the wireless technology selection framework to designate a critical factor, an overriding factor, and a non-overriding factor;

acquiring a set of information regarding the status and/or capabilities associated with each available wireless technology;

rendering numerical factor values for the factors;

defining a set of wireless technology selection criteria, wherein one or more of the factors are referenced in at least one criterion;

dynamically choosing one or more criteria from the set of criteria; and rendering a wireless technology selection based at least in part upon applying the numerical factor values to the chosen wireless technology selection criteria, comprising giving precedence to the critical factor over the overriding factor and the non-overriding factor, and giving precedence to the overriding factor over the non-overriding factor, further comprising calculating an arithmetic combination of the numerical factor values.

17. The computer storage medium of claim 16 wherein the rendering a selection step further comprises applying global information to the chosen wireless technology selection criteria.

18. The computer storage medium of claim 17 wherein the global information includes priorities of data sets.

19. The computer storage medium of claim 16 wherein the wireless technologies comprise at least 802.11a and 802.11b wireless technologies and the chosen criteria involve a network congestion factor.

20. The computer storage medium of claim 16 wherein the wireless technologies comprise at least 802.11a and UWB wireless technologies and the chosen criteria involve a signal interference factor.

21. The computer storage medium of claim 16 wherein the wireless technology selection framework further supports designating a set of weights applied to the factors and the wireless technology selection criteria comprise logical and/or arithmetic combination of weighted numerical factor values.

22. The computer storage medium of claim 21 wherein the weighted numerical factor values are combined to render an overall selection score for each combination of available wireless technologies.

23. The computer storage medium of claim 16 further comprising computer-executable instructions that facilitate issuing a prompt for user intervention when no available wireless technologies meet a requirement designated by at least one of the chosen criteria.

24. The computer storage medium of claim 21 further comprising computer-executable instructions that facilitate providing an interface through which a wireless technology selection criterion is configured dynamically by designating factors and/or weightings.

25. The computer storage medium of claim 21 wherein the rendering a selection step is performed in response to an event.

26. The computer storage medium of claim 25 wherein the event comprises expiration of a period.

27. The computer storage medium of claim 25 wherein the rendering a selection step is performed in response to an event associated with reassigning a weight to a factor referenced within a wireless technology selection criterion.

28. The computer storage medium of claim 27 wherein the reassigning a weight is carried out in response to a detected event.

29. The computer storage medium of claim 28 wherein the detected event corresponds to a change to a status of an application currently executing upon the computing device.

30. The computer storage medium of claim 28 wherein the detected event concerns a power source for the computing device.

31. A computing device having at least one transport driver and a plurality of network interface drivers, each network interface driver for establishing a network connection using an available wireless technology of multiple available wireless technologies, the computing device including an infrastructure supporting selecting a network and interface from a plurality of potential networks and interfaces, and wherein the interfaces potentially incorporate a variety of the available wireless technologies, the computing device comprising:

a wireless technology factor designation framework supporting specifying a set of factors;

an information gathering interface for acquiring a set of information regarding the status and/or capabilities associated with each available wireless technology; and a processor programmed to perform a factor value rendering function for establishing numerical factor values for the specified factors based upon the information acquired, wherein the numerical factor values are different from the information acquired;

a criterion specification framework supporting specifying a set of wireless technology selection criteria, wherein one or more of the specified factors are referenced in at one criterion;

a criterion selection engine for dynamically choosing one or more criteria from the set of criteria at least in part by evaluating a criterion selection logic based on the information acquired;

a wireless technology selection rendering engine for rendering a wireless interface selection based at least in part upon applying the numerical factor values to the chosen wireless technology selection criteria, wherein applying the numerical factor values to the chosen wireless technology selection criteria comprises arithmetic combination of the numerical factor values.

32. The computing device of claim 31 wherein the wireless technology selection rendering engine further applies global information to the chosen wireless technology selection criteria when rendering selections.

33. The computing device of claim 32 wherein the global information includes priorities of data sets.

34. The computing device of claim 31 wherein the wireless technologies comprise at least 802.11a and 802.11b wireless technologies and the chosen criteria involve a network congestion factor.

35. The computing device of claim 31 wherein the wireless technologies comprise at least 802.11a and UWB wireless technologies and the chosen criteria involve a signal interference factor.

36. The computing device of claim 31 wherein the criterion specification framework supports designating a set of weights applied to the factors and combining logically and/or arithmetically weighted numerical factor values.

37. The computing device of claim 36 wherein the weighted numerical factor values are combined to render an overall selection score for each combination of available wireless technologies.

38. The computing device of claim 31 wherein the wireless technology factor designation framework supports designating an overriding factor.

39. The computing device of claim 31 further comprising a user interface for issuing a prompt for user intervention when no available wireless technologies meet a requirement designated by at least one of the chosen criteria.

40. The computing device of claim 36 further comprising an interface through which a wireless technology selection criterion is configured dynamically by designating factors and/or weightings.

41. The computing device of claim 36 wherein the wireless interface selection is performed in response to an event.

42. The computing device of claim 41 wherein the event comprises expiration of a period.

43. The computing device of claim 41 wherein the wireless interface selection is performed in response to an event associated with reassigning a weight to a factor referenced within a wireless technology selection criterion.

44. The computing device of claim 43 wherein the reassigning a weight is carried out in response to a detected event.

45. The computing device of claim 44 wherein the detected event corresponds to a change to a status of an application currently executing upon the computing device.

46. The computing device of claim 44 wherein the detected event concerns a power source for the computing device.

47. The computing device of claim 44 wherein the detected event concerns a change in a set of available networks.

48. The computing device of claim 44 wherein the detected event concerns a change in congestion/interference parameter values.

49. The computing device of claim 44 wherein the detected event concerns a change in connectivity of a network.

* * * * *